United States Patent
Huang et al.

(10) Patent No.: US 12,458,271 B2
(45) Date of Patent: Nov. 4, 2025

(54) METHOD AND APPARATUS FOR ANALYZING HIGH-FREQUENCY QRS WAVEFORM DATA, COMPUTER DEVICE AND STORAGE MEDIUM

(71) Applicant: HYPERBIO BIOLOGICAL TECHNOLOGY CO., LTD, Changsha (CN)

(72) Inventors: Qinghong Huang, Changsha (CN); Qingxi Huang, Changsha (CN); Neng Zuo, Changsha (CN); Xiaoqin Li, Changsha (CN)

(73) Assignee: HYPERBIO BIOLOGICAL TECHNOLOGY CO., LTD, Changsha (CN)

( * ) Notice: Subject to any disclaimer, the term of this patent is extended or adjusted under 35 U.S.C. 154(b) by 0 days.

(21) Appl. No.: 18/989,236

(22) Filed: Dec. 20, 2024

(65) Prior Publication Data
US 2025/0213168 A1    Jul. 3, 2025

Related U.S. Application Data

(63) Continuation of application No. PCT/CN2023/093453, filed on May 11, 2023.

(30) Foreign Application Priority Data

Jun. 21, 2022 (CN) .......................... 202210705685.4

(51) Int. Cl.
*A61B 5/366* (2021.01)
(52) U.S. Cl.
CPC .................................. *A61B 5/366* (2021.01)
(58) Field of Classification Search
None
See application file for complete search history.

(56) References Cited

U.S. PATENT DOCUMENTS

| | | | |
|---|---|---|---|
| 2003/0013978 A1* | 1/2003 | Schlegel | A61B 5/349 600/509 |
| 2004/0039292 A1* | 2/2004 | Schlegel | A61B 5/366 600/509 |

(Continued)

FOREIGN PATENT DOCUMENTS

CN    113712569 A    11/2021

OTHER PUBLICATIONS

Lipton et al. âHigh-frequency QRS electrocardiogram analysis during exercise stress testing for detecting ischemiaâ Science Direct vol. 124, Issue 2, Feb. 29, 2008, pp. 198-203 (Year: 2008).*

(Continued)

*Primary Examiner* — Shirley X Jian
(74) *Attorney, Agent, or Firm* — Hemisphere Law, PLLC; Zhigang Ma

(57) ABSTRACT

The method includes: acquiring the high-frequency QRS waveform data; selecting first reference waveform data in a first time period; determining a first reference point with a minimum root-mean-square voltage in the first reference waveform data, determining a second reference point with a maximum root-mean-square voltage earlier than the first reference point; determining a first amplitude drop relative value according to the first reference point and the second reference point; determining a maximum voltage; selecting a third reference point with a maximum root-mean-square voltage and a fourth reference point with a minimum root-mean-square voltage later than the third reference point from the data in a second time period; determining a voltage difference according to the third reference point and the fourth reference point; screening the data with the first amplitude drop relative value greater than or equal to a first preset threshold, and determining the vascular response capability.

18 Claims, 5 Drawing Sheets

(56) References Cited

U.S. PATENT DOCUMENTS

| | | | | |
|---|---|---|---|---|
| 2008/0194978 A1* | 8/2008 | Beker | .................... | A61B 5/366 |
| | | | | 600/516 |
| 2018/0116538 A1* | 5/2018 | Musley | .................. | A61B 5/316 |
| 2024/0324937 A1* | 10/2024 | Li | ........................ | G06F 18/213 |

OTHER PUBLICATIONS

Claims of PCT/CN2023/093453.
CNIPA (ISA), Written opinion for PCT/CN2023/093453, Aug. 10, 2023.

\* cited by examiner

METHOD AND APPARATUS FOR ANALYZING HIGH-FREQUENCY QRS WAVEFORM DATA, COMPUTER DEVICE AND STORAGE MEDIUM

CROSS-REFERENCE TO RELATED APPLICATION

This application claims priority to Chinese Patent Application No. 2022107056854, filed to China National Intellectual Property Administration (CNIPA) on Jun. 21, 2022, entitled "METHOD AND APPARATUS FOR ANALYZING HIGH-FREQUENCY QRS WAVEFORM DATA, COMPUTER DEVICE AND STORAGE MEDIUM", which is herein incorporated by reference in its entirety.

TECHNICAL FIELD

The disclosure relates to the technical field of medical instruments, and more particularly to a method and an apparatus for analyzing high-frequency QRS waveform data, a computer device and a storage medium.

BACKGROUND

Vascular responsiveness of coronary artery can be referred to as coronary artery vascular response capability or vascular response capability. It can be used to characterize the immediate response capacity of blood vessels to rapid expansion of blood supply and can serve as one of indexes to evaluate the viability of cardiomyocytes to provide a doctor for reference, so that the doctor can accurately identify the heart health condition of a subject in combination with clinical signs and symptoms and the like. Therefore, how to accurately evaluate the vascular response capability is an issue worthy of attention.

At present, coronary angiography and other invasive methods are usually used to evaluate the coronary artery vascular response capability. However, the inventor realized that this invasive method will have a more or less impact on the health of the subject. There are also problems in evaluating the coronary artery vascular response capability by analyzing the changes of the ST segment and T-wave (also referred to as ST-T changes) in electrocardiogram (ECG). Although this non-invasive method will not have a negative impact on the health of the subject, the evaluation accuracy is low, so there is a problem that both non-invasive and accuracy cannot be taken into account.

SUMMARY

According to various embodiments disclosed in the disclosure, a method and an apparatus for analyzing high-frequency QRS waveform data, a computer device, and a storage medium are provided.

Specifically, in an aspect, a method for analyzing high-frequency QRS waveform data includes the following steps:
acquiring the high-frequency QRS waveform data corresponding to exercise ECG data;
selecting the high-frequency QRS waveform data in a first time period as first reference waveform data;
determining a first reference point according to a point with a minimum root-mean-square voltage in the first reference waveform data, and determining a second reference point according to a point with a maximum root-mean-square voltage and time earlier than the first reference point in the first reference waveform data;
determining a first amplitude drop relative value according to respective root-mean-square voltages of the first reference point and the second reference point;
determining a maximum voltage according to the high-frequency QRS waveform data;
selecting a point with a maximum root-mean-square voltage as a third reference point and a point with a minimum root-mean-square voltage and time later than the third reference point as a fourth reference point from the high-frequency QRS waveform data in a second time period;
determining a voltage difference according to respective root-mean-square voltages of the third reference point and the fourth reference point;
screening the high-frequency QRS waveform data with the first amplitude drop relative value greater than or equal to a first preset threshold; and
determining vascular response capability according to a ratio of the voltage difference corresponding to the screened high-frequency QRS waveform data to the maximum voltage.

In one embodiment, the screening the high-frequency QRS waveform data with the first amplitude drop relative value greater than or equal to a first preset threshold includes:
screening the high-frequency QRS waveform data of corresponding waveform categories as a first category, a second category and a third category.

Waveform characteristics of the first category include: a first amplitude drop relative value is greater than or equal to a first preset threshold, and a first amplitude rise relative value is greater than or equal to a second preset threshold.

Waveform characteristics of the second category include: the first amplitude drop relative value is greater than or equal to the first preset threshold, a second amplitude rise relative value is less than a third preset threshold, and a duration of a second reference waveform data is greater than or equal to a preset duration threshold.

Waveform characteristics of the third category include: the first amplitude drop relative value is greater than or equal to the first preset threshold, the second amplitude rise relative value is greater than or equal to the third preset threshold, and the duration of the second reference waveform data is greater than or equal to the preset duration threshold.

Steps of determining the first amplitude rise relative value include:
selecting a fifth reference point that meets a screening condition from the first reference waveform data; wherein a time of the fifth reference point is later than that of the first reference point; and
determining the first amplitude rise relative value based on the root-mean-square voltage of the first reference point and a root-mean-square voltage of the fifth reference point.

Steps of determining the second amplitude rise relative value include:
selecting, from the high-frequency QRS waveform data in the second time period, second reference waveform data whose amplitude fluctuation amplitude is less than or equal to a preset fluctuation amplitude;
selecting a point with a maximum root-mean-square voltage as a sixth reference point from the high-frequency QRS waveform data in a third time period; and
determining the second amplitude rise relative value based on a root-mean-square voltage of an end point of the second reference waveform data and the root-mean-square voltage of the sixth reference point.

In one embodiment, the screening the high-frequency QRS waveform data with the first amplitude drop relative value greater than or equal to a first preset threshold includes:

screening the high-frequency QRS waveform data of a corresponding waveform category as a first category; or screening the high-frequency QRS waveform data of a corresponding waveform category as a second category; or screening the high-frequency QRS waveform data of a corresponding waveform category as a third category.

Waveform characteristics of the first category include: the first amplitude drop relative value is greater than or equal to the first preset threshold, and a first amplitude rise relative value is greater than or equal to a second preset threshold.

Waveform characteristics of the second category include: the first amplitude drop relative value is greater than or equal to the first preset threshold, the second amplitude rise relative value is less than a third preset threshold, and a duration of the second reference waveform data is greater than or equal to a preset duration threshold.

Waveform characteristics of the third category include: the first amplitude drop relative value is greater than or equal to the first preset threshold, the second amplitude rise relative value is greater than or equal to the third preset threshold, and the duration of the second reference waveform data is greater than or equal to the preset duration threshold.

Steps of determining the first amplitude rise relative value includes:

selecting a fifth reference point that meets a screening condition from the first reference waveform data; a time of the fifth reference point is later than that of the first reference point; and determining the first amplitude rise relative value based on the root-mean-square voltage of the first reference point and a root-mean-square voltage of the fifth reference point.

Steps of determining the second amplitude rise relative value include:

selecting, from the high-frequency QRS waveform data in the second time period, second reference waveform data whose amplitude fluctuation amplitude is less than or equal to a preset fluctuation amplitude;

selecting a point with a maximum root-mean-square voltage as a sixth reference point from the high-frequency QRS waveform data in a third time period; and determining the second amplitude rise relative value based on a root-mean-square voltage of an end point of the second reference waveform data and the root-mean-square voltage of the sixth reference point.

In one embodiment, the determining vascular response capability according to a ratio of the voltage difference corresponding to the screened high-frequency QRS waveform data to the maximum voltage includes:

determining a reference index according to the screened high-frequency QRS waveform data; where the reference index includes the ratio of the voltage difference to the maximum voltage, and further includes at least one of a target amplitude drop relative value and an area of a target waveform drop region; and determining the vascular response capability according to the reference index.

In one embodiment, the method further includes:

determining a positive number according to the high-frequency QRS waveform data corresponding to the exercise ECG data.

The determining vascular response capability according to a ratio of the voltage difference corresponding to the screened high-frequency QRS waveform data to the maximum voltage includes:

determining the vascular response capability according to the ratio of the voltage difference corresponding to the screened high-frequency QRS waveform data to the maximum voltage and the positive number; or determining a reference index according to the screened high-frequency QRS waveform data, and determining the vascular response capability according to the reference index and the positive number; where the reference index includes the ratio of the voltage difference to the maximum voltage, and further includes at least one of a target amplitude drop relative value and an area of a target waveform drop region.

In another aspect, an apparatus for analyzing high-frequency QRS waveform data includes:

an acquisition module, configured to acquire the high-frequency QRS waveform data corresponding to exercise ECG data;

a selection module, configured to select the high-frequency QRS waveform data in a first time period as first reference waveform data;

the selection module is further configured to determine a first reference point according to a point with a minimum root-mean-square voltage in the first reference waveform data, and determining a second reference point according to a point with a maximum root-mean-square voltage and time earlier than the first reference point in the first reference waveform data;

an index determining module, configured to determine a first amplitude drop relative value according to respective root-mean-square voltages of the first reference point and the second reference point;

the index determining module is further configured to determine a maximum voltage according to the high-frequency QRS waveform data;

the selection module is further configured to select a point with a maximum root-mean-square voltage as a third reference point and a point with a minimum root-mean-square voltage and time later than the third reference point as a fourth reference point from the high-frequency QRS waveform data in a second time period;

the index determining module is further configured to determine a voltage difference according to respective root-mean-square voltages of the third reference point and the fourth reference point;

a screening module, configured to screen the high-frequency QRS waveform data with the first amplitude drop relative value greater than or equal to a first preset threshold; and the index determining module is further configured to determine vascular response capability according to a ratio of the voltage difference corresponding to the screened high-frequency QRS waveform data to the maximum voltage.

In one embodiment, the screening module is further configured to further configured to screen the high-frequency QRS waveform data of corresponding waveform categories as a first category, a second category and a third category. Waveform characteristics of the first category include: a first amplitude drop relative value is greater than or equal to a first preset threshold, and a first amplitude rise relative value is greater than or equal to a second preset threshold; waveform characteristics of the second category include: the first amplitude drop relative value is greater than or equal to the first preset threshold, a second amplitude rise relative value is less than a third preset threshold, and a duration of a second reference waveform data is greater than or equal to a preset duration threshold; and waveform characteristics of the third category include: the first amplitude drop relative value is greater than or equal to the first preset threshold, the second amplitude rise relative value is greater than or equal to the third preset threshold, and the duration of the second reference waveform data is greater than or equal to the preset duration threshold.

The selection module is further configured to select a fifth reference point that meets a screening condition from the first reference waveform data; and a time of the fifth reference point is later than that of the first reference point.

The index determining module is further configured to determine the first amplitude rise relative value based on the root-mean-square voltage of the first reference point and a root-mean-square voltage of the fifth reference point.

The selection module is further configured to select, from the high-frequency QRS waveform data in the second time period, second reference waveform data whose amplitude fluctuation amplitude is less than or equal to a preset fluctuation amplitude; and select a point with a maximum root-mean-square voltage as a sixth reference point from the high-frequency QRS waveform data in a third time period.

The index determining module is further configured to determine the second amplitude rise relative value based on a root-mean-square voltage of an end point of the second reference waveform data and the root-mean-square voltage of the sixth reference point.

In one embodiment, the screening module is further configured to screen the high-frequency QRS waveform data of a corresponding waveform category as a first category; or screen the high-frequency QRS waveform data of a corresponding waveform category as a second category; or screen the high-frequency QRS waveform data of a corresponding waveform category as a third category. The waveform characteristics of the first category include: a first amplitude drop relative value is greater than or equal to a first preset threshold, and a first amplitude rise relative value is greater than or equal to a second preset threshold; waveform characteristics of the second category include: the first amplitude drop relative value is greater than or equal to the first preset threshold, the second amplitude rise relative value is less than a third preset threshold, and a duration of the second reference waveform data is greater than or equal to a preset duration threshold; and waveform characteristics of the third category include: the first amplitude drop relative value is greater than or equal to the first preset threshold, the second amplitude rise relative value is greater than or equal to the third preset threshold, and the duration of the second reference waveform data is greater than or equal to the preset duration threshold.

The selection module is further configured to select a fifth reference point that meets a screening condition from the first reference waveform data; and a time of the fifth reference point is later than that of the first reference point.

The index determining module is further configured to determine the first amplitude rise relative value based on the root-mean-square voltage of the first reference point and a root-mean-square voltage of the fifth reference point.

The selection module is further configured to select, from the high-frequency QRS waveform data in the second time period, second reference waveform data whose amplitude fluctuation amplitude is less than or equal to a preset fluctuation amplitude; and select a point with a maximum root-mean-square voltage as a sixth reference point from the high-frequency QRS waveform data in a third time period.

The index determining module is further configured to determine the second amplitude rise relative value based on a root-mean-square voltage of an end point of the second reference waveform data and the root-mean-square voltage of the sixth reference point.

In one embodiment, the index determining module is further configured to determine a reference index according to the screened high-frequency QRS waveform data; where the reference index includes the ratio of the voltage difference to the maximum voltage, and further includes at least one of a target amplitude drop relative value and an area of a target waveform drop region; and determine the vascular response capability according to the reference index.

In one embodiment, the index determining module is further configured to determine a positive number according to the high-frequency QRS waveform data corresponding to the exercise ECG data; determine the vascular response capability according to the ratio of the voltage difference corresponding to the screened high-frequency QRS waveform data to the maximum voltage and the positive number; or, determine a reference index according to the screened high-frequency QRS waveform data, and determine the vascular response capability according to the reference index and the positive number; where the reference index includes the ratio of the voltage difference to the maximum voltage, and further includes at least one of a target amplitude drop relative value and an area of a target waveform drop region.

In still another aspect, a computer device includes a memory and a processor. The memory is stored with computer-readable instructions, and the processor is configured to implement, when the computer-readable instructions executed by the processor, steps in various method embodiments.

In even still another aspect, a non-transitory computer-readable storage medium is stored with computer-readable storage instructions, and the computer-readable storage instructions is configured to be executed by a processor to implement the steps in various method embodiments.

Details of one or more embodiments of the disclosure are set forth in the following drawings and description. Other features and advantages of the disclosure will be apparent from the description, drawings and claims.

BRIEF DESCRIPTION OF DRAWINGS

In order to more clearly illustrate technical solutions in embodiments of the disclosure, the drawings needed in the embodiments will be briefly introduced below. Apparently, the drawings in the following description are only some embodiments of the disclosure, and those skilled in the art can also obtain other drawings according to these drawings without creative work.

DETAILED DESCRIPTION OF EMBODIMENTS

In order to make technical solutions and advantages of the disclosure clearer, the disclosure will be further explained in detail with the attached drawings and embodiments. It should be understood that the specific embodiments described herein are only used to explain the disclosure, and are not used to limit the disclosure.

The method for analyzing high-frequency QRS waveform data provided by the disclosure can be applied to the terminal, the server, and the interactive system including the terminal and the server, and is realized through the interaction between the terminal and the server, which is not specifically limited herein. The terminals can be, but are not limited to, various personal computers, laptops, smartphones, tablet computers, electrocardiogramonitoring devices, and portable wearable devices, and the servers may be implemented with stand-alone servers or server clusters including multiple servers.

Figure 1:
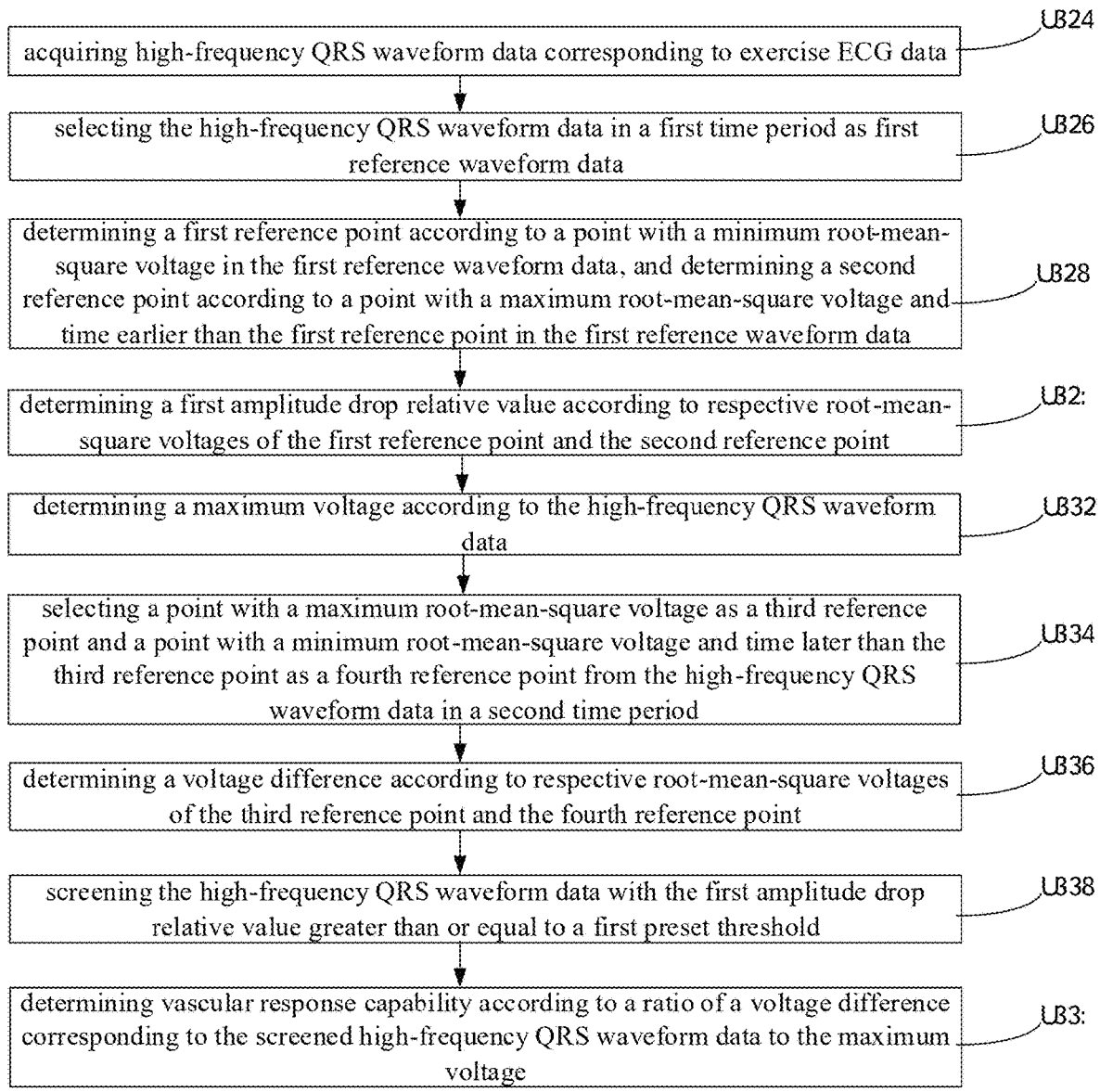
FIG. 1 illustrates a schematic flowchart of a method for analyzing high-frequency QRS waveform data according to one or more embodiments.

In some embodiments, as shown in FIG. 1, a method for analyzing high-frequency QRS waveform data is provided, as illustrated by an example of the method being applied to a server, and specifically includes the following steps.

S102, acquiring high-frequency QRS waveform data corresponding to exercise ECG data.

Exercise ECG data refers to ECG data collected during exercise stress ECG testing (also referred to as stress ECG testing). The exercise stress ECG testing is an ECG detection method that increases the heart load through a certain amount of exercise to collect the ECG data of the subjects, so as to analyze the heart health of the subjects based on the collected ECG data. It is widely used in the detection of heart diseases and cardiovascular diseases. The exercise ECG data includes multiple QRS complexes reflecting changes in left and right ventricular depolarization potentials and time, and each QRS complex is a combination of the Q wave, R wave, and S wave in the ECG. Based on the QRS complex in the exercise ECG data, the corresponding high-frequency QRS waveform data can be analyzed, which corresponds to the high-frequency QRS waveform curve, and the high-frequency QRS waveform data includes the data of points on the high-frequency QRS waveform curve (e.g., time and root-mean-square voltage). Thus, the corresponding high-frequency QRS waveform curve can be determined based on the high-frequency QRS waveform data. The high-frequency QRS waveform data/high-frequency QRS waveform curve is used to characterize the change trend of root-mean-square voltage of high-frequency components of the subject's QRS complex with time in the whole process of exercise stress ECG testing, that is, to reflect the energy change trend in the whole process of exercise stress ECG testing. The high-frequency QRS waveform data is presented by a high-frequency QRS waveform diagram. In the high-frequency QRS waveform diagram, the abscissa is time, which corresponds to the detection time of the exercise stress ECG testing process in minutes (min), and the ordinate is the root-mean-square voltage (RMS voltage), which can also be interpreted as the intensity or amplitude in microvolts (μV).

Specifically, the corresponding exercise ECG data of the subject in the whole process of exercise stress ECG testing are obtained, and the high-frequency components of the QRS complex in the exercise ECG data are analyzed to obtain the corresponding high-frequency QRS waveform data. Exercise ECG data includes ECG corresponding to each heartbeat of the subject during the whole process of exercise stress ECG testing, and the ECG includes QRS complex. The exercise ECG data is divided into multiple ECG data subsets according to the time sequence and a preset moving step size through the window function, and each ECG data subset includes ECG corresponding to multiple heartbeats. For each ECG data subset, the ECG or QRS complex corresponding to multiple heartbeats included in the ECG data subset is sequentially aligned, averaged and bandpass screened to obtain the corresponding high-frequency QRS complex (high-frequency band of QRS complex), and the root mean square of the high-frequency QRS complex is obtained to obtain the corresponding root-mean-square voltage, which is used as the root-mean-square voltage/intensity/amplitude corresponding to the ECG data subset. According to the root-mean-square voltage corresponding to each ECG data subset and the corresponding time, the corresponding high-frequency QRS waveform data can be obtained, so as to smooth the curve of each root-mean-square voltages in the high-frequency QRS waveform data according to the time sequence and obtain the corresponding high-frequency QRS waveform curve. Alternatively, curve smoothing is performed on the root-mean-square voltage corresponding to each ECG data subset according to the time sequence to obtain the corresponding high-frequency QRS waveform curve, and the corresponding high-frequency QRS waveform data is obtained according to the time and root-mean-square voltage of each point on the high-frequency QRS waveform curve.

It can be understood that both the window length and the preset moving step size of the window function can be customized according to actual requirements, for example, the window length is set to 10 seconds, the preset moving step size is set to 10 seconds or one heartbeat period, and one heartbeat period refers to the time interval between two adjacent heartbeats, which is not specifically limited here. The time sequence refers to the sequence of the acquisition time of the signal/the detection time of the exercise stress ECG testing process advancing.

In some embodiments, the exercise stress ECG testing process includes multiple stages, specifically, it can sequentially include three stages: resting stage, exercise stage and recovery stage. The exercise ECG data includes ECG data of each stage. It can be understood that the division of stages is not limited to this, but it can be divided according to the actual situation.

In some embodiments, in the process of exercise stress ECG testing, 10 electrode pads distributed in the chest and limbs of human body can be used to form 12 ECG leads (such as V1, V2, V3, V4, V5, V6, I, II, III, aVL, aVF and aVR), and 12 sets of ECG data can be correspondingly output to obtain the corresponding exercise ECG data in the whole exercise stress ECG testing process. It can be understood that 10 electrode pads are only used as an example, and are not used to specifically limit the number of electrode pads, which may be dynamically determined according to actual needs, such as more or less number of electrode pads. Therefore, the exercise ECG data includes ECG data corresponding to at least one ECG lead, and the high-frequency QRS waveform data corresponding to each ECG lead is obtained by analyzing the high-frequency components of QRS complex in the ECG data corresponding to each ECG lead respectively.

S104, selecting the high-frequency QRS waveform data in a first time period as first reference waveform data.

The first time period can be a time interval determined by a preset start time point and an end time point, or a time interval determined by a preset start time point and a preset duration. Specifically, the first time period may include a period before the exercise and a period during the exercise, or a period during the exercise, in which the period before the exercise is in a resting stage and the period during the exercise is in an exercise stage, such as a period after the exercise begins. For example, the corresponding time range of the exercise stage is 3 to 9 min in the high-frequency QRS waveform curve, the first time period is, for example, the time interval characterized by [1 min 20 s, 6 minutes], which includes 100 s before exercise and the first 3 min during exercise; and the first time period is also, for example, characterized by [3 min, 6 min], which includes the first 3 minutes during exercise. It can be understood that the above examples are used only for exemplary purposes and are not intended to be specifically limited. The first reference waveform data is the data in the high-frequency QRS waveform data whose time is within the first time period, and the time of each point in the first reference waveform data is within the first time period. The starting point and ending point of the first reference waveform data are the starting point and ending point of the first time period respectively. The starting point of the first reference waveform data refers to the earliest point in the first reference waveform data, that is, the first point in the first reference waveform data when sorted according to time sequence. The definition of the end point is similar and will not be repeated here.

S106, determining a first reference point according to a point with a minimum root-mean-square voltage in the first reference waveform data, and determining a second reference point according to a point with a maximum root-mean-square voltage and time earlier than the first reference point in the first reference waveform data.

Specifically, the position of each point in the first reference waveform data is determined by the time and root-mean-square voltage of the point, the root-mean-square voltage of each point in the first reference waveform data is traversed according to time sequence, the point with the minimum root-mean-square voltage is selected from the first reference waveform data based on the traversed root-mean-square voltage, and the first reference point is determined according to the point with the minimum root-mean-square voltage. The second reference point is determined according to the point whose time is earlier/less than the time of the first reference point and with the maximum root-mean-square voltage selected from the first reference waveform data.

In some embodiments, the selected point with the minimum root-mean-square voltage is taken as the first reference point, or, the selected point with the minimum root-mean-square voltage is corrected according to a preconfigured first correction coefficient and the corrected point is taken as the first reference point. The selected point with the maximum root-mean-square voltage and time earlier than the first reference point is taken as the second reference point, or, the selected point with the maximum root-mean-square voltage is corrected according to a preconfigured second correction coefficient and the corrected point is taken as the second reference point.

Specifically, the root-mean-square voltage corresponding to the point with the minimum root-mean-square voltage is corrected by the preconfigured first correction coefficient to obtain the corrected root-mean-square voltage, and the point in the first reference waveform data whose root-mean-square voltage is consistent with the corrected root-mean-square voltage is selected as the first reference point. Similarly, the second reference point is determined based on the point where the preconfigured second correction coefficient and the selected point with the maximum root-mean-square voltage, which will not be described in detail here. It can be understood that if there are multiple points in the first reference waveform data where the root-mean-square voltage is consistent with the corrected root-mean-square voltage, one of them can be selected as the corresponding reference point, provided that the time of the second reference point is earlier than that of the first reference point. The first correction coefficient and the second correction coefficient can be customized or dynamically determined according to the user portrait of the subject, and can be specific functions determined based on the user portrait. The first correction coefficient is greater than 1 and the second correction coefficient is less than 1. The user portrait includes at least one of the subject's age, gender, weight, clinical symptoms, living habits, etc.

S108: determining a first amplitude drop relative value according to respective root-mean-square voltages of the first reference point and the second reference point.

Specifically, based on the first reference waveform data, the root-mean-square voltages of the first reference point and the second reference point are respectively obtained, and the root-mean-square voltage of the second reference point and the root-mean-square voltage of the first reference point are differentiated to obtain a first amplitude drop absolute value, and a ratio of the first amplitude drop absolute value to the root-mean-square voltage of the second reference point is determined as a first amplitude drop relative value.

S110: determining a maximum voltage according to the high-frequency QRS waveform data.

The maximum voltage can be understood as the maximum power, which can be used to reflect the maximum heart pumping function of the subject. Specifically, the maximum root-mean-square voltage is obtained from the high-frequency QRS waveform data as the target voltage, and the corresponding maximum voltage is determined according to the target voltage. The target voltage can be determined as the maximum voltage, or the maximum voltage can be obtained by correcting the target voltage through a preconfigured third correction coefficient. The third correction coefficient is customized according to the actual situation. For example, if a sum of the third correction coefficient and the target voltage is taken as the maximum voltage, the third correction coefficient can be set to 1 µV; and if a product of the third correction coefficient and the target voltage is taken as the maximum voltage, the third correction coefficient can be set to 1.2. It can be understood that the maximum voltage can also be obtained by rounding up the target voltage or the target voltage corrected by the third correction coefficient. For example, if the target voltage or the target voltage corrected by the third correction coefficient is 9.6 µV, the maximum voltage can be determined to be 10 µV by the rounding up. The third correction coefficient and the correction method of the target voltage are not specifically limited here.

In some embodiments, for a single subject, if there is one ECG lead, the maximum root-mean-square voltage is obtained from the high-frequency QRS waveform data corresponding to the ECG lead as the target voltage. If there is more than one ECG lead (multiple ECG leads), the maximum value of root-mean-square voltage is obtained from the high-frequency QRS waveform data corresponding to each ECG lead, and the maximum root-mean-square voltage is selected as the target voltage based on the comparison of the maximum values of root-mean-square voltages corresponding to respective ECG leads. In this way, the maximum voltage is determined based on the target voltage.

In some embodiments, the high-frequency QRS waveform data corresponding to each ECG lead includes not only the data of each point on the corresponding high-frequency QRS waveform curve, but also the maximum voltage determined according to one or more embodiments of the disclosure.

S112: selecting a point with a maximum root-mean-square voltage as a third reference point and a point with a minimum root-mean-square voltage and time later than the third reference point as a fourth reference point from the high-frequency QRS waveform data in a second time period.

The second time period can specifically include a period before exercise, a period during exercise and a period after exercise. The period before exercise is in the resting stage, the period during exercise includes the whole exercise stage, and the period after exercise is in the recovery stage. The period before exercise, the period during exercise and the period after exercise are sequential time periods. For example, the corresponding time range of the exercise stage in the high-frequency QRS waveform data is 3 to 9 min, and the second time period is the time interval represented by [1 min 20 s, 9 min 20 s], which starts at 1 min 20 s and ends at 9 min 20 s. The second time period includes 100 s before exercise, 6 min during exercise and 20 s after exercise. The second time period includes the first time period, and the starting point of the second time period may be the same as the starting point of the first time period.

Specifically, the root-mean-square voltage of each point in the high-frequency QRS waveform data in the second time period is traversed, and based on the traversed root-mean-square voltage, the point with the maximum root-mean-square voltage in the high-frequency QRS waveform data in the second time period is selected as the third reference point, and the point with the minimum root-mean-square voltage and time later/longer than the third reference point in the high-frequency QRS waveform data in the second time period is selected as the fourth reference point.

In some embodiments, the third reference point and the second reference point may be the same point, specifically determined by the corresponding high-frequency QRS waveform data. If there are multiple points with the maximum root-mean-square voltage in the high-frequency QRS waveform data in the second time period, the point with the earliest time is selected as the third reference point from the multiple points with the maximum root-mean-square voltage.

S114: determining a voltage difference according to respective root-mean-square voltages of the third reference point and the fourth reference point.

Specifically, a difference between the root-mean-square voltage of the third reference point and the root-mean-square voltage of the corresponding fourth reference point is used to obtain the voltage difference corresponding to the corresponding high-frequency QRS waveform data. It can be understood that the voltage difference can be understood as an amplitude drop absolute value, specifically, it can be a second amplitude drop absolute value in one or more embodiments in the disclosure.

Figure 2:
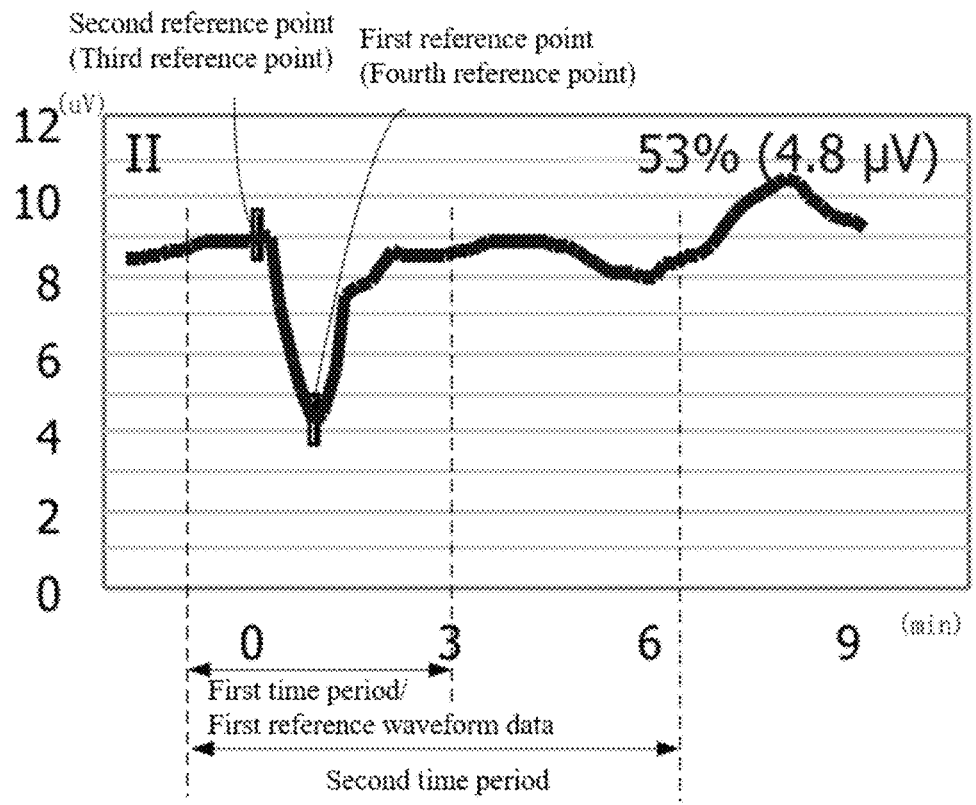
FIG. 2 illustrates a schematic diagram of selected reference points based on the high-frequency QRS waveform data according to one or more embodiments.

In some embodiments, FIG. 2 provides a schematic diagram of selecting reference points based on high-frequency QRS waveform data. As shown in FIG. 2, the high-frequency QRS waveform diagram shows the high-frequency QRS waveform curve determined based on the high-frequency QRS waveform data corresponding to ECG lead II, with the abscissa being time in min and the ordinate being root-mean-square voltage/amplitude in μV. The corresponding time range of the exercise stage in the high-frequency QRS waveform data is 0 to 6 min, the first time period is the time interval corresponding to [100 s before 0, 3 min], and the second time period is the time interval corresponding to [100 s before 0, 6 min 20 s]. The first reference waveform data includes the data in the first time period in the high-frequency QRS waveform data. The first reference point is the point with the minimum root-mean-square voltage in the first reference waveform data, the second reference point is the point with the maximum root-mean-square voltage and time earlier than the first reference point in the first reference waveform data, the third reference point is the point with the maximum root-mean-square voltage in the second time period, and the fourth reference point is the point with the minimum root-mean-square voltage and time later than the third reference point in the second time period. In this embodiment, the third reference point and the second reference point are the same point, the fourth reference point and the first reference point are the same point, the maximum voltage is 12 μV (the maximum value of the ordinate presented/displayed in the high-frequency QRS waveform diagram), the voltage difference (the second amplitude drop absolute value) determined based on the third reference point and the fourth reference point is 4.8 μV, and the second amplitude drop relative value is 53%. It can be understood that the high-frequency QRS waveform data shown in FIG. 2 and the corresponding selected reference points, as well as the selection of the first reference point and the second reference point, are only examples and are not used for specific limitation.

S116: screening the high-frequency QRS waveform data with the first amplitude drop relative value greater than or equal to a first preset threshold.

The first preset threshold can be customized according to the empirical value, such as 40%, or dynamically determined according to the user portrait of the subject, which includes at least one parameter such as age, weight, gender and load level, and is not specifically limited here.

Specifically, for a single subject, high-frequency QRS waveform data with corresponding first amplitude drop relative value greater than or equal to the first preset threshold are screened from each high-frequency QRS waveform data corresponding to exercise ECG data, so as to determine the vascular response capability based on the screened high-frequency QRS waveform data.

In some embodiments, if the first time period includes a period before exercise and a period during exercise, the high-frequency QRS waveform data with the first amplitude drop relative value greater than or equal to the first preset threshold and the time interval between the first reference point and the second reference point less than or equal to the preset time interval are screened, so as to determine the ratio of voltage difference to maximum voltage based on the screened high-frequency QRS waveform data. Alternatively, a reference index including the ratio of voltage difference to maximum voltage is used to further determine the vascular response capability. The preset time interval can be customized according to the actual situation, such as 3 min.

In some embodiments, if the first amplitude drop relative value corresponding to each high-frequency QRS waveform data corresponding to the exercise ECG data is less than the first preset threshold, it is not necessary to further determine the corresponding vascular response capability, but output each high-frequency QRS waveform data for the doctor's reference. It can be understood that the high-frequency QRS waveform data can also be output synchronously for doctors' reference under the condition of determining and outputting the vascular response capability.

S118: determining vascular response capability according to a ratio of the voltage difference corresponding to the screened high-frequency QRS waveform data to the maximum voltage.

Vascular response capability is used to characterize the difference of coronary artery vascular response capability for doctors' reference, so that doctors can accurately identify the health status of the heart according to the vascular response capability and clinical symptoms, and then give reference suggestions for further diagnosis and treatment or testing.

Specifically, for each of the screened high-frequency QRS waveform data, the ratio of voltage difference to maximum voltage can be determined based on the corresponding voltage difference and maximum voltage. Further, the vascular response capability is determined according to the ratio of the voltage difference corresponding to each of the screened high-frequency QRS waveform data to the maximum voltage.

In some embodiments, the maximum value of the ratio of the voltage difference to the maximum voltage is screened from the ratio of the voltage difference to the maximum voltage corresponding to the screened high-frequency QRS waveform data, and the vascular response capability is determined according to the screened ratio of the voltage difference to the maximum voltage. For example, if the ratios of the voltage difference to the maximum voltage corresponding to the three of high-frequency QRS waveform data are 16%, 40% and 52% respectively, then the vascular response capability is determined according to 52% (the maximum value of the ratio of the voltage difference to the maximum voltage). It can be understood that the screened maximum value of the ratio of the voltage difference to the maximum voltage can be understood as the target ratio of the voltage difference to the maximum voltage.

In some embodiments, the corresponding voltage difference and maximum voltage can be determined for each of high-frequency QRS waveform data corresponding to the exercise ECG data before screening the high-frequency QRS waveform data with the first amplitude drop relative value greater than or equal to the first preset threshold. Alternatively, after screening high-frequency QRS waveform data with the first amplitude drop relative value greater than or equal to a first preset threshold, the corresponding voltage difference and maximum voltage can be determined for each screened high-frequency QRS waveform data. It can be understood that for single high-frequency QRS waveform data, the corresponding voltage difference and the maximum voltage can be determined with reference to the methods provided in one or more embodiments of the disclosure, so as to determine the ratio of the voltage difference to the maximum voltage corresponding to the high-frequency QRS waveform data based on the voltage difference and the maximum voltage.

In some embodiments, the ratio of the voltage difference to the maximum voltage can reflect the coronary artery vascular response capability, which are negatively correlated. Therefore, the corresponding vascular response capability can be determined based on the ratio of the voltage difference to the maximum voltage. For example, the greater the ratio of the voltage difference to the maximum voltage, the lower or smaller the corresponding vascular response capability is (the higher the attention priority is), so as to represent the weaker the coronary artery vascular response capability. Specifically, the corresponding vascular response capability can be determined according to the ratio threshold interval where the ratio of the voltage difference to the maximum voltage is located. Based on the determination method of the ratio of the voltage difference to the maximum voltage provided in one or more embodiments of the disclosure, it can be known that the ratio of the voltage difference to the maximum voltage is related to the individual difference of the subject. Therefore, the vascular response capability of the subject can be accurately evaluated based on this ratio.

For example, there are four ratio threshold intervals from the first ratio threshold interval to the fourth ratio threshold interval with decreasing reference priority, such as: greater than or equal to 46%, greater than or equal to 40% and less than 46%, greater than or equal to 30% and less than 40%, greater than or equal to 16% and less than 30% respectively. If the ratio of the voltage difference to the maximum voltage is in the first ratio threshold interval, the vascular response capability is marked as the first level with the highest attention priority, and if the ratio of the voltage difference to the maximum voltage is within the second ratio threshold interval, the vascular response capability is marked as the second level with the second highest attention priority, and so on, which will not be enumerated here. It can be understood that if the ratio of the voltage difference to the maximum voltage is not in any ratio threshold interval (for example, less than 16%), the vascular response capability can be marked as the level with the lowest attention priority, the related operation of further determining the vascular response capability based on the ratio of the voltage difference to the maximum voltage can be omitted, and the vascular response capability can also be determined based on other reference indexes provided in the disclosure.

In some embodiments, after screening out high-frequency QRS waveform data with the first amplitude drop relative value greater than or equal to the first preset threshold, a reference index is determined according to the screened high-frequency QRS waveform data, and the vascular response capability is determined according to the reference index. The reference index includes the ratio of the voltage difference to the maximum voltage, and further includes at least one of the target amplitude drop relative value and an area of a target waveform drop region. It can be understood that the positive number can also be determined according to the high-frequency QRS waveform data corresponding to the exercise ECG data, and the vascular response capability can be determined according to the positive number and the reference index (the ratio of the voltage difference to the maximum voltage).

It can be understood that, in one or more embodiments of the disclosure, regardless of the waveform categories corresponding to the high-frequency QRS waveform data, the ratio of the voltage difference to the maximum voltage in the reference index refers to the maximum value of the ratio of the voltage difference to the maximum voltage corresponding to each high-frequency QRS waveform data whose corresponding first amplitude drop relative value is greater than or equal to the first preset threshold. The target amplitude drop relative value refers to the maximum of the second amplitude drop relative value corresponding to each high-frequency QRS waveform data whose corresponding first amplitude drop relative value is greater than or equal to the first preset threshold. The area of the target waveform drop region refers to the sum, average or maximum of the area of the waveform drop region corresponding to each high-frequency QRS waveform data whose corresponding first amplitude drop relative value is greater than or equal to the first preset threshold.

According to the method for analyzing high-frequency QRS waveform data, by analyzing the high-frequency QRS waveform data corresponding to exercise ECG data, two characteristic points in the first time period are selected as the first reference point and the second reference point respectively, two characteristic points in the second time period are selected as the third reference point and the fourth reference point respectively, and the corresponding maximum voltage is determined. The first amplitude drop relative value is obtained by quantifying the waveform change of the high-frequency QRS waveform data in the first time period based on the first reference point and the second reference point, and the voltage difference representing the amplitude drop degree is obtained based on the third reference point and the fourth reference point. When it is determined that the first amplitude drop relative value is greater than or equal to the first preset threshold, the waveform change representing the high-frequency QRS waveform data meets the requirements, and the vascular response capability with high accuracy can be obtained according to the ratio of the voltage difference to the maximum voltage. Therefore, the coronary artery vascular response capability of the subject can be accurately evaluated in a non-invasive way, and further, the vascular response capability with high accuracy can be provided to doctors for reference, so that doctors can accurately identify the heart health status of the subject in combination with clinical symptoms.

In some embodiments, S116 includes: screening the high-frequency QRS waveform data of corresponding waveform categories as a first category, a second category and a third category. The waveform characteristics of the first category include: a first amplitude drop relative value is greater than or equal to a first preset threshold, and a first amplitude rise relative value is greater than or equal to a second preset threshold. The waveform characteristics of the second category include: the first amplitude drop relative value is greater than or equal to the first preset threshold, a second amplitude rise relative value is less than a third preset threshold, and a duration of a second reference waveform data is greater than or equal to a preset duration threshold. The waveform characteristics of the third category include: the first amplitude drop relative value is greater than or equal to the first preset threshold, the second amplitude rise relative value is greater than or equal to the third preset threshold, and the duration of the second reference waveform data is greater than or equal to the preset duration threshold. The steps of determining the first amplitude rise relative value include: selecting a fifth reference point that meets a screening condition from the first reference waveform data; a time of the fifth reference point is later than that of the first reference point; and determining the first amplitude rise relative value based on the root-mean-square voltage of the first reference point and a root-mean-square voltage of the fifth reference point. The steps of determining the second amplitude rise relative value include: selecting, from the high-frequency QRS waveform data in the second time period, second reference waveform data whose amplitude fluctuation amplitude is less than or equal to a preset fluctuation amplitude; selecting a point with a maximum root-mean-square voltage as a sixth reference point from the high-frequency QRS waveform data in a third time period; and determining the second amplitude rise relative value based on a root-mean-square voltage of an end point of the second reference waveform data and the root-mean-square voltage of the sixth reference point.

The first category includes V-type, the second category includes L-type and the third category includes U-type. The screening condition is a constraint condition for screening the fifth reference point from the first reference waveform data, which can be the end point of the first reference waveform data or the first inflection point in the first reference waveform data whose time is later/greater than the first reference point. The inflection point, also known as the point of inflection, refers to the point that changes the upward or downward direction of the curve, that is, the boundary point between the concave arc and the convex arc on the curve corresponding to the first reference waveform data. If there are multiple inflection points in the first reference waveform data whose time is later than the first reference point, the earliest inflection point among the inflection points is determined as the first inflection point. If there is no inflection point in the first reference waveform data whose time is later than the first reference point, the ending point of the first reference waveform data is determined as the fifth reference point. The third time period may specifically include a period of time after the exercise in the recovery stage. The third time period may be adjacent to the second time period, for example, the end time point of the second time period is the start time point of the third time period. For example, the corresponding time range of the recovery stage in the high-frequency QRS waveform curve is 9 to 12 min, and the third time period is the time interval represented by [9 min, 20 s, 12 min].

The amplitude fluctuation amplitude is used to characterize the fluctuation degree or change degree of the amplitude, and can be specifically used to characterize the fluctuation degree between the amplitudes (that is, the root-mean-square voltages) of respective points in the second reference waveform data. The amplitude fluctuation amplitude of the second reference waveform data can be specifically determined based on the maximum and minimum values of the root-mean-square voltages in the second reference waveform data, for example, the corresponding amplitude fluctuation amplitude can be obtained by the difference between the maximum and minimum values of the root-mean-square voltage. The preset fluctuation amplitude can be customized according to requirements, such as 1 µV, and can also be dynamically determined according to the root-mean-square voltage of the second reference point or the third reference point. The preset fluctuation amplitude is positively correlated with the root-mean-square voltage of the second reference point (or the third reference point). Specifically, the preset fluctuation amplitude can be dynamically determined according to the root-mean-square voltage of the second reference point (or the third reference point) and a preset proportional value, for example, 10% of the root-mean-square voltage of the second or third reference point is determined as the preset fluctuation amplitude, and the preset proportional value of 10% is for example only and is not used for specific limitation.

The duration of the second reference waveform data refers to the difference between the time corresponding to the ending point and the starting point of the second reference waveform data. Similarly, the second preset threshold, the third preset threshold and the preset duration threshold can be customized according to empirical values, for example, the second preset threshold is set to 30%, the third preset threshold is set to 56%, and the preset duration threshold is set to 3 min, which can also be dynamically determined according to the user portrait of the subject, and is not specifically limited here.

Specifically, whether the waveform category of each of high-frequency QRS waveform data corresponding to exercise ECG data is the first category, the second category or the third category is analyzed, and high-frequency QRS waveform data with corresponding waveform categories of the first category, the second category and the third category are screened, so as to screen the high-frequency QRS waveform data with waveform category of the first category, the high-frequency QRS waveform data with waveform category of the second category and the high-frequency QRS waveform data with waveform category of the third category from the high-frequency QRS waveform data corresponding to the exercise ECG data. Thus, the screened high-frequency QRS waveform data includes high-frequency QRS waveform data of the first category, high-frequency QRS waveform data of the second category and high-frequency QRS waveform data of the third category, so as to determine the vascular response capability according to the ratio of the voltage difference corresponding to the screened high-frequency QRS waveform data to the maximum voltage.

The step of analyzing whether the waveform category of high-frequency QRS waveform data is the first category includes: selecting the end point of the first reference waveform data as the fifth reference point, or selecting the first inflection point after the first reference point from the first reference waveform data as the fifth reference point; performing the difference between the root-mean-square voltage of the fifth reference point and the root-mean-square voltage of the first reference point to obtain a first amplitude rise absolute value, and determining the ratio of the first amplitude rise absolute value to the root-mean-square voltage of the first reference point as a first amplitude rise relative value. If the first amplitude drop relative value is greater than or equal to the first preset threshold, and the first amplitude rise relative value is greater than or equal to the second preset threshold, the waveform category of the corresponding high-frequency QRS waveform data is determined to be the first category.

The step of analyzing whether the waveform category of the high-frequency QRS waveform data is the second category includes: traversing the root-mean-square voltage of each point in the high-frequency QRS waveform data in the second time period, and based on the traversed root-mean-square voltage, selecting data whose amplitude fluctuation amplitude is less than or equal to a preset fluctuation amplitude from the high-frequency QRS waveform data in the second time period as the second reference waveform data; selecting data in the third time period from high-frequency QRS waveform data, traversing the root-mean-square voltage of each point in the selected data, and selecting the point with the maximum root-mean-square voltage from the selected data as a sixth reference point based on the traversed root-mean-square voltage; making a difference between the root-mean-square voltage of the sixth reference point and the root-mean-square voltage of the end point of the second reference waveform data to obtain a second amplitude rise absolute value, and determining the ratio of the second amplitude rise absolute value to the root-mean-square voltage of the end point of the second reference waveform data as a second amplitude rise relative value. If the first amplitude drop relative value is greater than or equal to the first preset threshold, the second amplitude rise relative value is less than the third preset threshold, and the duration of the second reference waveform data is greater than or equal to the preset duration threshold, the waveform category of the corresponding high-frequency QRS waveform data is determined to be the second category. The duration of the second reference waveform data is determined based on the respective times of the starting point and the ending point of the second reference waveform data.

The step of analyzing whether the waveform category of the high-frequency QRS waveform data is the third category, including: traversing the root-mean-square voltage of each point in the high-frequency QRS waveform data in the second time period, and based on the traversed root-mean-square voltage, selecting data whose amplitude fluctuation amplitude is less than or equal to the preset fluctuation amplitude from the high-frequency QRS waveform data in the second time period as second reference waveform data; selecting data in the third time period from high-frequency QRS waveform data, traversing the root-mean-square voltage of each point in the selected data, and selecting the point with the maximum root-mean-square voltage from the selected data as a sixth reference point based on the traversed root-mean-square voltage; making a difference between the root-mean-square voltage of the sixth reference point and the root-mean-square voltage of the end point of the second reference waveform data to obtain the second amplitude rise absolute value, and determining the ratio of the second amplitude rise absolute value to the root-mean-square voltage of the end point of the second reference waveform data as the second amplitude rise relative value. If the first amplitude drop relative value is greater than or equal to the first preset threshold, the second amplitude rise relative value is greater than or equal to the third preset threshold, and the duration of the second reference waveform data is greater than or equal to the preset duration threshold, the waveform category of the corresponding high-frequency QRS waveform data is determined to be the third category.

For example, it is assumed that there are 12 ECG leads, and among the high-frequency QRS waveform data corresponding to each of the 12 ECG leads, there are 2 high-frequency QRS waveform data with the first category, 1 high-frequency QRS waveform data with the second category and 1 high-frequency QRS waveform data with the third category, the corresponding high-frequency QRS waveform data with the first, second and third categories are selected from the 12 high-frequency QRS waveform data, and the vascular response capability is determined based on the selected 4 high-frequency QRS waveform data.

In some embodiments, the high-frequency QRS waveform data in the second time period is taken as the target waveform data, and specifically, the second reference waveform data whose amplitude fluctuation amplitude is less than or equal to the preset fluctuation amplitude can be selected from the target waveform data with reference to the related art, which is not repeated here. For example, firstly, data whose corresponding amplitude fluctuation amplitude meets the requirements (the amplitude fluctuation amplitude is less than or equal to the preset fluctuation amplitude) and whose duration is short (for example, 1 min or 30 s) are selected from the target waveform data as candidate data. Then, based on the candidate data, the range of the candidate data is expanded based on the points in the target waveform data that are adjacent before and/or after the candidate data. If the amplitude fluctuation amplitude corresponding to the expanded candidate data still meets the requirements, the candidate data continues to be expanded according to the method until the amplitude fluctuation amplitude corresponding to the expanded candidate data does not meet the requirements, the range expansion of the candidate data is stopped, and the candidate data obtained from the previous range expansion is determined as the second reference waveform data. The curve determined based on the second reference waveform data is a continuous subsection in the corresponding high-frequency QRS waveform curve.

In some embodiments, whether the waveform category of each of high-frequency QRS waveform data is the first category, the second category or the third category is analyzed in a parallel or serial manner. For the serial analysis manner, the analysis can be carried out in sequentially according to the waveform analysis function corresponding to each preset category in the preset order. If it is determined that the waveform category of high-frequency QRS waveform data is not the corresponding preset category based on the current waveform analysis function, the analysis will be continued based on the waveform analysis function corresponding to the next preset category in the preset order until the stop condition is met, the current analysis process will stopped, and the stop condition includes traversing all preset categories in the preset order, or the waveform category of high-frequency QRS waveform data is the corresponding preset category is judged based on the current waveform analysis function. The preset order is not specifically limited here. In this embodiment, the preset categories include the first category, the second category and the third category. If the preset categories include more or less categories, similar logic can be used for processing. If the waveform category of the high-frequency QRS waveform data is any preset category (that is, the waveform category of the high-frequency QRS waveform data is any one of the first category, the second category and the third category), it is determined that the waveform category of the high-frequency QRS waveform data is the preset category. The waveform analysis function corresponding to the preset category may include the related steps of analyzing whether the high-frequency QRS waveform data is the corresponding preset category provided in one or more embodiments of the disclosure, which are not repeated here.

In the above embodiment, the waveform category is high-frequency QRS waveform data of the first category, the second category or the third category, which can better reflect the coronary artery vascular response capability. Therefore, the high-frequency QRS waveform data with corresponding waveform categories of the first category, the second category and the third category are screened, so as to obtain more accurate vascular response capability based on the screened high-frequency QRS waveform data.

In some embodiments, high-frequency QRS waveform data with waveform categories of the first and second categories are screened, or high-frequency QRS waveform data with waveform categories of the first and third categories are screened, or high-frequency QRS waveform data with waveform categories of the second and third categories are screened, and the vascular response capability is determined according to the screened high-frequency QRS waveform data. In this embodiment, the preset category includes the first category and the second category, or the first category and the third category, or the second category and the third category, so as to determine the vascular response capability for the high-frequency QRS waveform data of the preset category based on the waveform category.

In some embodiments, S116 includes: screening high-frequency QRS waveform data whose corresponding waveform category as the first category; or, screening the high-frequency QRS waveform data with the corresponding waveform category as the second category; or, screening the high-frequency QRS waveform data with the corresponding waveform category as the third category. The waveform characteristics of the first category include: the first amplitude drop relative value is greater than or equal to the first preset threshold, and a first amplitude rise relative value is greater than or equal to a second preset threshold. The waveform characteristics of the second category include: the first amplitude drop relative value is greater than or equal to the first preset threshold, the second amplitude rise relative value is less than a third preset threshold, and a duration of the second reference waveform data is greater than or equal to a preset duration threshold. The waveform characteristics of the third category include: the first amplitude drop relative value is greater than or equal to the first preset threshold, the second amplitude rise relative value is greater than or equal to the third preset threshold, and the duration of the second reference waveform data is greater than or equal to the preset duration threshold. The steps of determining the first amplitude rise relative value include: selecting a fifth reference point that meets a screening condition from the first reference waveform data; a time of the fifth reference point is later than that of the first reference point; and determining the first amplitude rise relative value based on the root-mean-square voltage of the first reference point and a root-mean-square voltage of the fifth reference point. The steps of determining the second amplitude rise relative value include: selecting, from the high-frequency QRS waveform data in the second time period, second reference waveform data whose amplitude fluctuation amplitude is less than or equal to a preset fluctuation amplitude; selecting a point with a maximum root-mean-square voltage as a sixth reference point from the high-frequency QRS waveform data in a third time period; and determining the second amplitude rise relative value based on a root-mean-square voltage of an end point of the second reference waveform data and the root-mean-square voltage of the sixth reference point.

Specifically, whether the waveform category of each of high-frequency QRS waveform data corresponding to exercise ECG data is the first category is analyzed, and the high-frequency QRS waveform data with the corresponding waveform category of the first category is screened, so as to determine the vascular response capability according to the ratio of the voltage difference corresponding to the high-frequency QRS waveform data with the waveform category of the first category to the maximum voltage. Alternatively, whether the waveform category of each of high-frequency QRS waveform data corresponding to the exercise ECG data is the second category is analyzed, and the high-frequency QRS waveform data with the corresponding waveform category of the second category is screened, so as to determine the vascular response capability according to the ratio of the voltage difference corresponding to the high-frequency QRS waveform data with the waveform category of the second category to the maximum voltage. Alternatively, whether the waveform category of each of high-frequency QRS waveform data corresponding to exercise ECG data is the third category is analyzed, and the high-frequency QRS waveform data corresponding to the third category is screened, so as to determine the vascular response capability according to the ratio of the voltage difference corresponding to the high-frequency QRS waveform data with the third category to the maximum voltage.

In some embodiments, if the first amplitude drop relative value is greater than or equal to the first preset threshold, and the first amplitude rise relative value is greater than or equal to the second preset threshold, which indicates that the corresponding high-frequency QRS waveform data includes a V-type waveband, it is determined that the waveform category corresponding to the corresponding high-frequency QRS waveform data is V-type (the first category). According to the methods provided in one or more embodiments of the disclosure, the vascular response capability is further determined according to each high-frequency QRS waveform data with the corresponding waveform category being V-type. It can be understood that the waveform category of the high-frequency QRS waveform data shown in FIG. 2 is V-type. In this way, the waveform change of high-frequency QRS waveform data is quantified by the waveform analysis function corresponding to V-type, so as to analyze whether the waveform category of high-frequency QRS waveform data is V-type, so as to accurately determine the vascular response capability based on each high-frequency QRS waveform curve with V-type waveform category.

In some embodiments, if the first amplitude drop relative value is greater than or equal to the first preset threshold, the second amplitude rise relative value is less than the third preset threshold, and the duration of the second reference waveform data is greater than or equal to the preset duration threshold, which indicates that the corresponding high-frequency QRS waveform data includes an L-type waveband, the waveform category of the corresponding high-frequency QRS waveform data is determined to be L-shaped, so as to further determine the vascular response capability based on each high-frequency QRS waveform data with L-type waveform category. In this way, the waveform change of high-frequency QRS waveform data is quantized by the waveform analysis function corresponding to L-type to analyze whether the waveform category of high-frequency QRS waveform data is L-shape, so as to accurately determine the vascular response capability based on each high-frequency QRS waveform data with L-shape waveform category.

Figure 3:
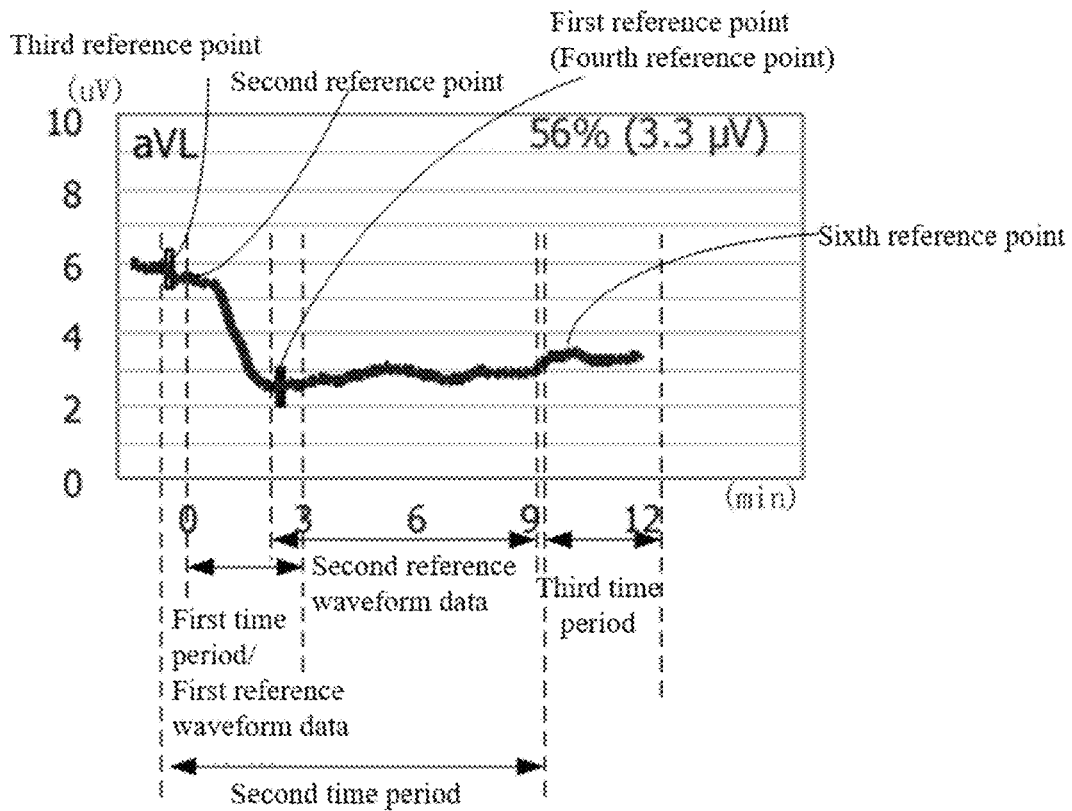
FIG. 3 illustrates a schematic diagram of the selected reference points and reference waveform data based on the high-frequency QRS waveform data according to one or more embodiments.

In some embodiments, FIG. 3 provides a schematic diagram of selecting each reference point and reference waveform data based on high-frequency QRS waveform data. As shown in FIG. 3, the high-frequency QRS waveform diagram shows the high-frequency QRS waveform data corresponding to ECG lead aVL, and the corresponding time range of the exercise stage in the high-frequency QRS waveform data is 0 to 9 min. The first time period includes the first 3 min during exercise (exercise stage), the high-frequency QRS waveform data in the first time period is the first reference waveform data, the point with the minimum root-mean-square voltage in the first reference waveform data is the first reference point, and the point in the first reference waveform data with time earlier than the first reference point and with maximum root-mean-square voltage is the second reference point. The second time period includes 100 s before exercise (at resting stage), 9 min of exercise and 20 s after exercise (at recovery stage). The data with amplitude fluctuation amplitude less than or equal to the preset fluctuation amplitude (such as 0.5 µV) within the second time period is the second reference waveform data. The point with the maximum root-mean-square voltage in the second time period is the third reference point, and the point with the minimum root-mean-square voltage and time later the third reference point in the second time period is the fourth reference point. The third time period includes the time interval from the $20^{th}$ second after the end of the exercise to the end of the exercise stress ECG testing process, such as the time interval characterized by [9 min 20 s, 12 min], and the point with the maximum root-mean-square voltage in the high-frequency QRS waveform data in the third time period is the sixth reference point. Based on the root-mean-square voltages of the third reference point and the fourth reference point, the second amplitude drop absolute value and the second amplitude drop relative value are 3.3 µV and 56%, respectively. The maximum voltage and voltage difference corresponding to the high-frequency QRS waveform data shown in FIG. 3 are 10 µV and 3.3 V, respectively, and their waveform types are L-type. It can be understood that in the high-frequency QRS waveform curve shown, the first reference point and the fourth reference point are the same point. The high-frequency QRS waveform data shown in FIG. 3, the corresponding selected reference points and reference waveform data, and the selection of the first reference point and the second reference point are only examples, and are not used for specific limitation.

In some embodiments, if the first amplitude drop relative value is greater than or equal to the first preset threshold, the second amplitude rise relative value is greater than or equal to the third preset threshold, and the duration of the second reference waveform data is greater than or equal to the preset duration threshold, which indicates that the corresponding high-frequency QRS waveform data includes a U-type waveband, the waveform category of the corresponding high-frequency QRS waveform data is determined to be U-type, and the vascular response capability is further determined based on each high-frequency QRS waveform curve with the waveform category of U-type. In this way, the waveform change of high-frequency QRS waveform data is quantized by the waveform analysis function corresponding to the U-type to analyze whether the waveform category of high-frequency QRS waveform data is U-type, so as to accurately determine the vascular response capability based on each high-frequency QRS waveform data with the U-type waveform category.

Figure 4:
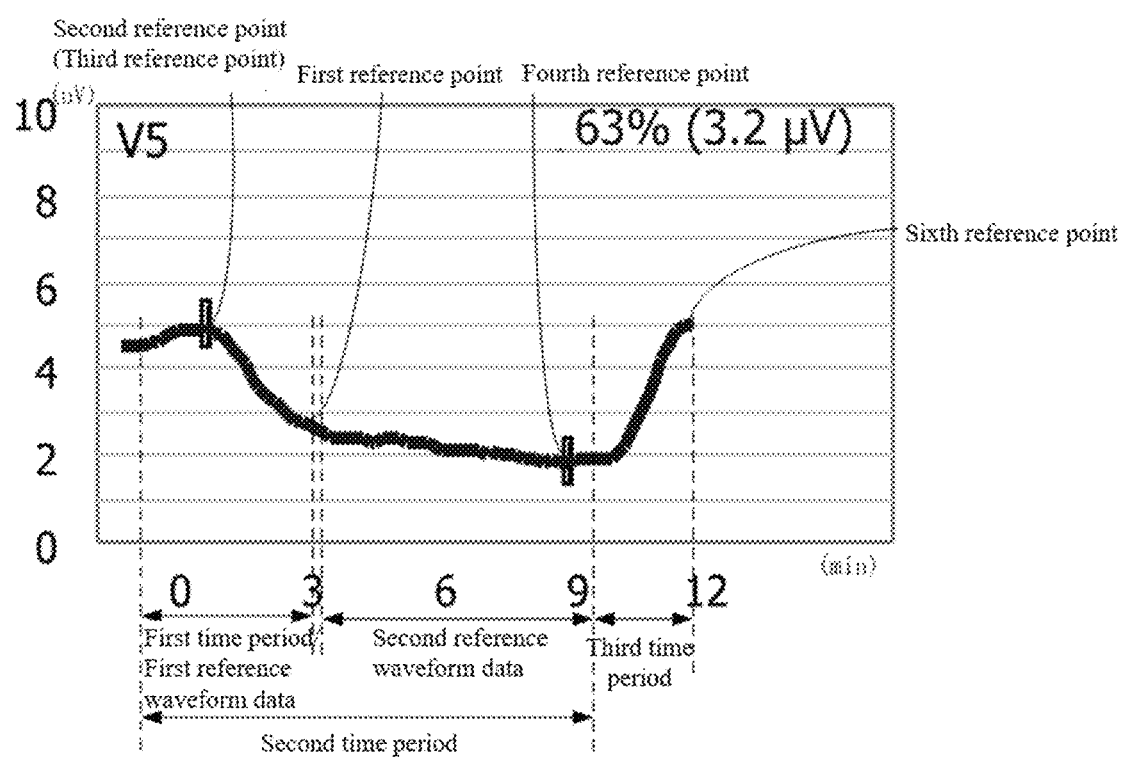
FIG. 4 illustrates a schematic diagram of selected reference points and reference waveform data based on high-frequency QRS waveform data according to another embodiment.

In some embodiments, FIG. 4 provides a schematic diagram of selecting each reference point and reference waveform data based on high-frequency QRS waveform data. As shown in FIG. 4, the high-frequency QRS waveform diagram shows the high-frequency QRS waveform data corresponding to ECG lead V5, and the corresponding time range of the exercise stage in the high-frequency QRS waveform data is 0 to 9 min. The first time period includes 100 s before exercise (at resting stage) and the first 3 min during exercise (at exercise stage), and the high-frequency QRS waveform data in the first time period is the first reference waveform data. The point with the minimum root-mean-square voltage in the first reference waveform data is the first reference point, and the point with time earlier than the first reference point and with the maximum root-mean-square voltage in the first reference waveform data is the second reference point. The second time period includes 100 s before exercise (at resting stage), 9 min of exercise and 20 s after exercise (at recovery stage). The data in the second time period with the amplitude fluctuation amplitude less than or equal to the preset fluctuation amplitude (such as 0.5 µV) is the second reference waveform data, the point with the maximum root-mean-square voltage in the second time period is the third reference point, and the point with the minimum root-mean-square voltage after the third reference point is the fourth reference point. The third time period includes the time interval from the 20$^{th}$ second after the end of the exercise to the end of the exercise stress ECG testing process, specifically, the time interval represented by [9 min 20 s, 12 min], the point with the maximum root-mean-square voltage in the high-frequency QRS waveform data in the third time period is the sixth reference point. Based on the root-mean-square voltages of the third reference point and the fourth reference point, the second amplitude drop absolute value and the second amplitude drop relative value are 3.2 µV and 63%, respectively. The maximum voltage and voltage difference corresponding to the high-frequency QRS waveform data shown in FIG. 4 are 10 µV and 3.2 µV, respectively, and its waveform category is U-type. In this embodiment, the second reference point and the third reference point are the same point. The high-frequency QRS waveform data shown in FIG. 4, the corresponding selected reference points and reference waveform data, and the selection of the first reference point and the second reference point are only examples, and are not used for specific limitation.

In one or more embodiments of the disclosure, if the first time period includes a period before exercise and a period during exercise, the waveform characteristics of the first category, the second category and the third category respectively further include that the time interval between the first reference point and the second reference point is less than or equal to the preset time interval. Taking the first category as an example, the waveform characteristics of the first category include: the first amplitude drop relative value is greater than or equal to the first preset threshold, the first amplitude rise relative value is greater than or equal to the second preset threshold, and the time interval between the first reference point and the second reference point is less than or equal to the preset time interval, which are not listed here.

In some embodiments, S118 includes: determining a reference index according to the screened high-frequency QRS waveform data; and determining the vascular response capability according to the reference index. The reference index includes the ratio of the voltage difference to the maximum voltage, and further includes at least one of a target amplitude drop relative value and an area of a target waveform drop region.

The ratio of the voltage difference to the maximum voltage in the reference index refers to the maximum value of the ratio of the voltage difference to the maximum voltage corresponding to the selected high-frequency QRS waveform data, which can be understood as the target ratio of the voltage difference to the maximum voltage. The target amplitude drop relative value refers to the maximum value of the second amplitude drop relative value corresponding to the selected high-frequency QRS waveform data, and the area of the target waveform drop region refers to the sum, average or maximum value of the area of the waveform drop region corresponding to the selected high-frequency QRS waveform data.

Specifically, the ratio of voltage difference to maximum voltage is determined according to the screened high-frequency QRS waveform data, and at least one of reference indexes such as target amplitude drop relative value and target waveform drop region is also determined. On the basis of the ratio of voltage difference to maximum voltage, the vascular response capability is determined by combining at least one of target amplitude drop relative value and target waveform drop region.

In one or more embodiments of the disclosure, if the waveform category corresponding to high-frequency QRS waveform data is considered and the reference index is determined by selecting the waveform category as the preset high-frequency QRS waveform data, the ratio of voltage difference to maximum voltage in the reference index refers to the maximum value of the ratio of voltage difference to maximum voltage corresponding to each high-frequency QRS waveform data with the corresponding waveform category as the preset category. The target amplitude drop relative value refers to the maximum of the second amplitude drop relative values corresponding to each high-frequency QRS waveform data with the preset category, and the area of the target waveform drop region refers to the sum, average or maximum of the area of the waveform drop region corresponding to each high-frequency QRS waveform data with the preset category. The preset category includes at least one of the first category (such as V-type), the second category (such as L-type) and the third category (such as U-type).

Taking the preset category including L-type as an example, the ratio of the voltage difference to the maximum voltage in the reference index refers to the maximum value of the ratio of the voltage difference to the maximum voltage corresponding to each high-frequency QRS waveform data with the corresponding waveform category of L-type. Taking the preset categories including V-type, U-type and L-type as examples, whether the waveform category of each high-frequency QRS waveform data is V-type, U-type, or L-type is analyzed, and the high-frequency QRS waveform data with V-type, U-type, and L-type is screened. If there are 2 high-frequency QRS waveform data with V-type, 1 high-frequency QRS waveform data with L-type, and 1 high-frequency QRS waveform data with U-type, then the reference index is determined according to the 4 high-frequency QRS waveform data screened. For details, please refer to the method provided in one or more embodiments of the disclosure to determine each reference index according to the 4 high-frequency QRS waveform data screened, which is not repeated here.

In some embodiments, determining the target amplitude drop relative value according to the screened high-frequency QRS waveform data includes: determining a second amplitude drop relative value according to the root-mean-square voltages of the corresponding third reference point and fourth reference point for each screened high-frequency QRS waveform data; and determining the maximum of the second amplitude drop relative value corresponding to the screened high-frequency QRS waveform data as the target amplitude drop relative value. Specifically, the root-mean-square voltage of the third reference point is differentiated from the root-mean-square voltage of the corresponding fourth reference point to obtain the second amplitude drop absolute value, and the ratio of the second amplitude drop absolute value to the root-mean-square voltage of the third reference point is taken as the second amplitude drop relative value. It can be understood that if the waveform category of high-frequency QRS waveform data is V-type, the first reference point is selected as the fourth reference point, and the corresponding determined first amplitude drop relative value is determined as the second amplitude drop relative value. If the waveform category of high-frequency QRS waveform data is U-type or L-type, the point with the minimum root-mean-square voltage is selected from the second reference waveform data as the fourth reference point.

In some embodiments, the target amplitude drop relative value can reflect the coronary artery vascular response capability, and the two are negatively correlated. The vascular response capability can be determined based on the target amplitude drop relative value. For example, the greater the target amplitude drop relative value, the smaller or lower the corresponding vascular response capability is, which indicates that the coronary artery vascular response capability is weaker. Therefore, according to the ratio of the voltage difference to the maximum voltage and the target amplitude drop relative value, more accurate vascular response capability can be obtained, and the vascular response capability can be determined according to the respective threshold intervals. Specifically, the ratio of the voltage difference to the maximum voltage and the target amplitude drop relative value are compared with their respective threshold intervals, so as to determine the reference priority of the threshold interval as the reference priority of the corresponding reference index, and the reference index or dimension with higher reference priority is screened to determine the vascular response capability. Alternatively, according to the ratio of the voltage difference to the maximum voltage and the respective threshold intervals of the target amplitude drop relative value, the vascular response capability is determined, and the vascular response capability with higher priority is screened as the final vascular response capability. It can be understood that if the ratio of the voltage difference to the maximum voltage and the target amplitude drop relative value have the same reference priority, one of them can be screened to determine the vascular response capability.

For example, for the target amplitude drop relative value, four amplitude threshold intervals from the first amplitude threshold interval to the fourth amplitude threshold interval whose reference priorities decrease in sequence are preconfigured, namely, greater than or equal to 66%, greater than or equal to 60% and less than 66%, greater than or equal to 50% and less than 60%, and greater than or equal to 40% and less than 50%, and the corresponding reference priorities are recorded as the first to fourth levels respectively. For example, if the target amplitude drop relative value is in the first amplitude threshold interval, the reference priority of the target amplitude drop relative value is determined as the first level with the highest reference priority. Similarly, if the ratio of the voltage difference to the maximum voltage is in the second ratio threshold interval, the reference priority of the ratio of the voltage difference to the maximum voltage is determined as the second level with the second highest reference priority. When the reference priority (first level) of the target amplitude drop relative value is higher than the reference priority (second level) of the ratio of the voltage difference to the maximum voltage, the vascular response capability is determined according to the amplitude threshold interval where the target amplitude drop relative value is located. When the target amplitude drop relative value is in the first amplitude threshold interval, the vascular response capability is determined as the first level with the highest attention priority.

For another example, if the target amplitude drop relative value is within the first amplitude threshold interval, the vascular response capability is determined as the first level with the highest attention priority, and if the ratio of the voltage difference to the maximum voltage is within the second ratio threshold interval, the vascular response capability is determined as the second level with the second highest attention priority, and the second level with the higher attention priority is screened as the final vascular response capability through comparison. With reference to the corresponding relationship between the ratio of the voltage difference to the maximum voltage and the vascular response capability, it can be known that if the target amplitude drop relative value is within the second amplitude threshold interval, the vascular response capability is determined as the second level with the second highest priority, and so on, which will not be enumerated here.

In some embodiments, determining the target waveform drop region according to the screened high-frequency QRS waveform data includes: selecting a seventh reference point and an eighth reference point from the screened high-frequency QRS waveform data; and determining the area of the waveform drop region according to the seventh reference point, the eighth reference point, and the high-frequency QRS waveform data; and determining the sum, average or maximum value of the waveform drop region corresponding to the screened high-frequency QRS waveform data as the target waveform drop region.

Specifically, for each of screened high-frequency QRS waveform data, the point corresponding to the starting point of the exercise stage in the high-frequency QRS waveform data is taken as the seventh reference point, or the second reference point (or the third reference point) is taken as the seventh reference point, and the point corresponding to the ending point of the exercise stage in the high-frequency QRS waveform data is taken as the eighth reference point. The root-mean-square voltage of the seventh reference point is determined as the reference amplitude, the closed region determined by the reference amplitude, the eighth reference point and the high-frequency QRS waveform data and below the reference amplitude is determined as the waveform drop region, and the absolute drop area is obtained by calculating the area of the closed region through the first function, which is taken as the area of the waveform drop region of the corresponding high-frequency QRS waveform data. Alternatively, the closed region determined by the seventh reference point, the eighth reference point, the high-frequency QRS waveform data and the reference axis with zero root-mean-square voltage (the horizontal axis of the high-frequency QRS waveform diagram) is taken as the reference region, the area of the reference region is calculated by the second function to obtain the reference area, the ratio of the absolute drop area to the reference area is determined as the relative drop area, and the relative drop area is taken as the area of the waveform drop region of the corresponding high-frequency QRS waveform data. Alternatively, the absolute drop area and the relative drop area calculated in the above manner are used as the area of the waveform drop region of the corresponding high-frequency QRS waveform data. The time of the seventh reference point is earlier than the time of the eighth reference point.

In some embodiments, the area of the target waveform drop region can be used to reflect the coronary artery vascular response capability, and the two are negatively correlated. The corresponding vascular response capability can be determined based on the area of the target waveform drop region. For example, the larger the area of the target waveform drop region, the lower or smaller the corresponding vascular response capability (the higher the attention priority), so as to represent the weaker the coronary artery vascular response capability. Therefore, according to the ratio of the voltage difference to the maximum voltage and the area of the target waveform drop region, more accurate vascular response capability can be obtained, and the vascular response capability can be specifically determined according to their respective threshold intervals.

For example, taking the determination of vascular response capability in combination with the area of the target waveform drop region and the ratio of the voltage difference to the maximum voltage as an example, there are three area threshold intervals from the first area threshold interval to the third area threshold interval with decreasing reference priority. If the ratio of the voltage difference to the maximum voltage is in the first ratio threshold interval and the area of the target waveform drop region is in the first area threshold interval, the vascular response capability is marked as the first level. If the ratio of the voltage difference to the maximum voltage is in the second ratio threshold interval, and the area of the target waveform drop region is in the first area threshold interval, the vascular response capability is marked as the second level, which is not listed here. It can be understood that the higher the reference priority of the area threshold interval, the larger the value in the area threshold interval. If the waveform drop region includes absolute drop area and/or relative drop area, the area threshold interval preconfigured for the waveform drop region includes absolute area threshold interval preconfigured for the absolute drop area and/or relative area threshold interval preconfigured for the relative drop area. Therefore, if the area of the target waveform drop region is in the first area threshold interval, the included target absolute drop area and/or target relative drop area are respectively in the corresponding area threshold interval in the first area threshold interval, which will not be described in detail herein.

In some embodiments, according to the ratio of the voltage difference to the maximum voltage, the area of the target waveform drop region, and the target amplitude drop relative value, more accurate vascular response capability can be obtained. Specifically, based on the respective threshold intervals of each reference index, corresponding multiple combinations can be obtained. With reference to the determination method of vascular response capability provided in one or more embodiments of the disclosure, corresponding vascular response capability can be obtained according to various combinations of each reference index, which will not be described in detail herein. For example, if the area of the target waveform drop region is in the first area threshold interval, the target amplitude drop relative value is in the first amplitude threshold interval and/or the ratio of the voltage difference to the maximum voltage is in the first ratio threshold interval, the vascular response capability is marked as the first level with the highest attention priority.

In the above embodiment, based on the ratio of the voltage difference to the maximum voltage, combined with at least one of the target amplitude drop relative value and the area of the target waveform drop region, more accurate vascular response capability can be obtained for doctors' reference.

In some embodiments, the method for analyzing the high-frequency QRS waveform data further includes: determining a positive number according to the high-frequency QRS waveform data corresponding to the exercise ECG data. S118 includes: determining the vascular response capability according to the ratio of the voltage difference corresponding to the screened high-frequency QRS waveform data to the maximum voltage and the positive number; or, determining a reference index according to the screened high-frequency QRS waveform data, and determining the vascular response capability according to the reference index and the positive number. The reference index includes the ratio of the voltage difference to the maximum voltage, and further includes at least one of the target amplitude drop relative value and the area of the target waveform drop region.

Specifically, the corresponding lead positive index is determined according to each of high-frequency QRS waveform data corresponding to the exercise ECG data, the high-frequency QRS waveform data with the lead positive indexes being positive are screened and counted from the high-frequency QRS waveform data corresponding to the exercise ECG data to obtain the positive number corresponding to the exercise ECG data, the ratio of the voltage difference to the maximum voltage is determined according to the screened high-frequency QRS waveform data, and the vascular response capability is determined according to the determined ratio of the voltage difference to the maximum voltage and the positive number. Alternatively, according to the method provided in one or more embodiments of the disclosure, the reference index is determined according to the screened high-frequency QRS waveform data, and the vascular response capability is determined according to the reference index and the positive number.

In some embodiments, for each of high-frequency QRS waveform data corresponding to the exercise ECG data, the second amplitude drop absolute value and the second amplitude drop relative value are determined according to the root-mean-square voltages of the third reference point and the fourth reference point, and the lead positive index of the corresponding high-frequency QRS waveform data is determined according to the second amplitude drop absolute value and the second amplitude drop relative value. If the second amplitude drop absolute value and the second amplitude drop relative value of the high-frequency QRS waveform data meet the preset lead positive condition, the lead positive index indicates that the corresponding ECG lead is positive. The preset lead positive condition can be customized according to the actual detection situation, and can be adaptively adjusted according to the age, gender, height, weight and other factors of the subject. For example, the second amplitude drop absolute value is greater than 1 µV and the second amplitude drop relative value is greater than 50%, which is not specifically limited herein.

In some embodiments, the positive number can be used to reflect the coronary artery vascular response capability, and the two are negatively correlated. Based on the positive number, the corresponding vascular response capability can be determined. For example, the greater the positive number, the lower or smaller the corresponding vascular response capability (the higher the attention priority), so as to represent the weaker the coronary artery vascular response capability. Therefore, according to the ratio of the voltage difference to the maximum voltage and the positive number, more accurate vascular response capability can be obtained, specifically, the vascular response capability can be determined according to the respective threshold intervals.

For example, taking the determination of vascular response capability by combining the positive number and the ratio of the voltage difference to the maximum voltage as an example, four number threshold intervals with decreasing reference priority are preconfigured for the positive number, namely, greater than or equal to 7, greater than or equal to 5 and less than 7, greater than or equal to 3 and less than 5, and greater than or equal to 1 and less than 3. If the ratio of the voltage difference to the maximum voltage is in the first ratio threshold interval, and the positive number is in the first number threshold interval, the vascular response capability is marked as the first level. If the ratio of the voltage difference to the maximum voltage is in the second ratio threshold interval, and the positive number is in the first number threshold interval, the vascular response capability is marked as the second level, which will not be enumerated herein. It can be understood that if the reference priority of the ratio threshold interval where the ratio of the voltage difference to the maximum voltage is located is higher, and the reference priority of the number threshold interval where the positive number is located is lower, the attention priority of the vascular response capability can be appropriately lowered.

In some embodiments, based on the method for determining the vascular response capability based on the reference index provided in one or more embodiments of the disclosure, it can be known that more accurate vascular response capability can be obtained by combining at least one of the target amplitude drop relative value and the area of target waveform drop region on the basis of the ratio of the voltage difference to the maximum voltage and the positive number. The specific combination method and the corresponding vascular response capability determination method can refer to the records of the corresponding embodiments, which will not be described in detail herein. For example, if the positive number is in the first number threshold interval, the area of the target waveform drop region is in the first area threshold interval, and the target amplitude drop relative value is in the first amplitude threshold interval and/or the ratio of the voltage difference to the maximum voltage is in the first ratio threshold interval, the vascular response capability is marked as the first level with the highest attention priority.

Figure 5:
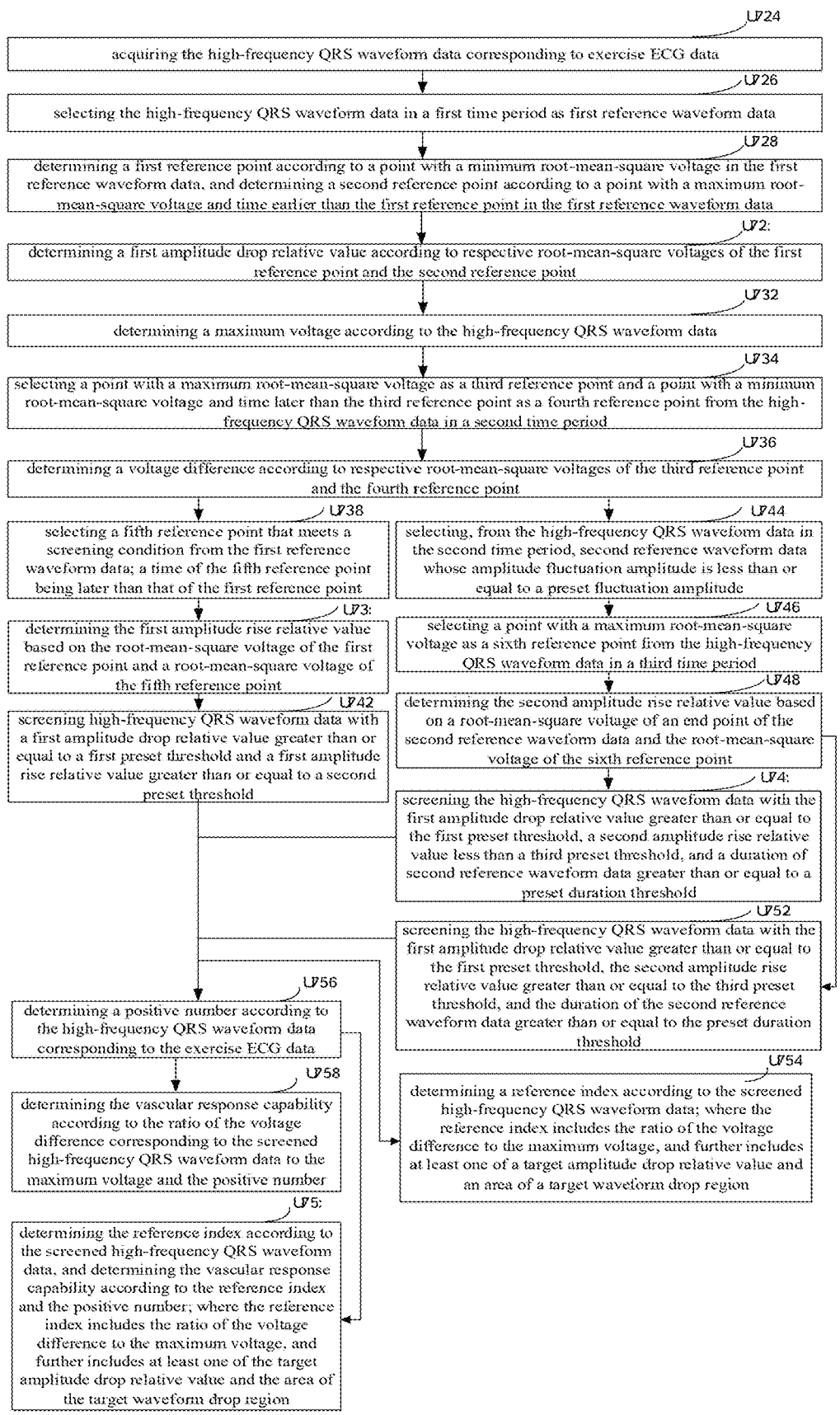
FIG. 5 illustrates a schematic flowchart of a method for analyzing high-frequency QRS waveform data according to still another embodiment.

As shown in FIG. 5, in some embodiments, a method for analyzing high-frequency QRS waveform data is provided, which specifically includes the following steps.

S502, acquiring the high-frequency QRS waveform data corresponding to exercise ECG data.

S504, selecting the high-frequency QRS waveform data in a first time period as first reference waveform data.

S506: determining a first reference point according to a point with a minimum root-mean-square voltage in the first reference waveform data, and determining a second reference point according to a point with a maximum root-mean-square voltage and time earlier than the first reference point in the first reference waveform data.

S508: determining a first amplitude drop relative value according to respective root-mean-square voltages of the first reference point and the second reference point.

S510: determining a maximum voltage according to the high-frequency QRS waveform data.

S512: selecting a point with a maximum root-mean-square voltage as a third reference point and a point with a minimum root-mean-square voltage and time later than the third reference point as a fourth reference point from the high-frequency QRS waveform data in a second time period.

S514: determining a voltage difference according to respective root-mean-square voltages of the third reference point and the fourth reference point.

S516: selecting a fifth reference point that meets a screening condition from the first reference waveform data; a time of the fifth reference point being later than that of the first reference point.

S518: determining the first amplitude rise relative value based on the root-mean-square voltage of the first reference point and a root-mean-square voltage of the fifth reference point.

S520, screening high-frequency QRS waveform data with a first amplitude drop relative value greater than or equal to a first preset threshold and a first amplitude rise relative value greater than or equal to a second preset threshold.

S522: selecting, from the high-frequency QRS waveform data in the second time period, second reference waveform data whose amplitude fluctuation amplitude is less than or equal to a preset fluctuation amplitude.

S524: selecting a point with a maximum root-mean-square voltage as a sixth reference point from the high-frequency QRS waveform data in a third time period.

S526: determining the second amplitude rise relative value based on a root-mean-square voltage of an end point of the second reference waveform data and the root-mean-square voltage of the sixth reference point.

S528: screening the high-frequency QRS waveform data with the first amplitude drop relative value greater than or equal to the first preset threshold, a second amplitude rise relative value less than a third preset threshold, and a duration of second reference waveform data greater than or equal to a preset duration threshold.

S530: screening the high-frequency QRS waveform data with the first amplitude drop relative value greater than or equal to the first preset threshold, the second amplitude rise relative value greater than or equal to the third preset threshold, and the duration of the second reference waveform data greater than or equal to the preset duration threshold.

S532, determining a reference index according to the screened high-frequency QRS waveform data; where the reference index includes the ratio of the voltage difference to the maximum voltage, and further includes at least one of a target amplitude drop relative value and an area of a target waveform drop region.

S534: determining a positive number according to the high-frequency QRS waveform data corresponding to the exercise ECG data.

S536: determining the vascular response capability according to the ratio of the voltage difference corresponding to the screened high-frequency QRS waveform data to the maximum voltage and the positive number.

S538, determining the reference index according to the screened high-frequency QRS waveform data, and determining the vascular response capability according to the reference index and the positive number; where the reference index includes the ratio of the voltage difference to the maximum voltage, and further includes at least one of the target amplitude drop relative value and the area of the target waveform drop region.

In the above embodiment, whether the waveform category of each of high-frequency QRS waveform data is the preset category (such as the first category, the second category or the third category) is analyzed, and the high-frequency QRS waveform data with the waveform categories of the first category, the second category and the third category are screened for determining the reference index including the ratio of the voltage difference to the maximum voltage, and at least one of the target amplitude drop relative value and the area of the target waveform drop region, so that the vascular response capability is determined according to the reference index. Alternatively, the positive number is determined according to the high-frequency QRS waveform data corresponding to the exercise ECG data, and the vascular response capability is determined according to the positive number and the ratio of the voltage difference to the maximum voltage (or, the reference index), so as to accurately evaluate the vascular response capability in a non-invasive way for the doctor's reference to facilitate the doctor to accurately identify the heart health status of the subject in combination with clinical symptoms.

It should be understood that although the steps in the flowcharts of FIG. 1 and FIG. 5 are shown sequentially as indicated by arrows, these steps are not necessarily executed sequentially as indicated by the arrows. Unless explicitly stated herein, the execution of these steps is not strictly limited in order, and these steps can be executed in other orders. Moreover, at least a part of the steps in FIG. 1 and FIG. 5 may include multiple steps or stages, which may not necessarily be completed at the same time, but may be executed at different times, and the execution order of these steps or stages may not necessarily be sequentially executed, but may be alternately or alternatively executed with other steps or at least a part of steps or stages in other steps.

Figure 6:
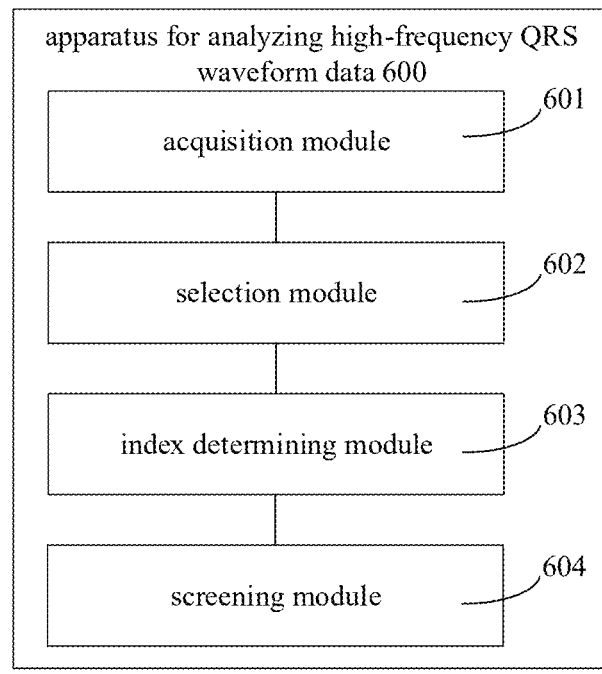
FIG. 6 illustrates a structural block diagram of a device for analyzing the high-frequency QRS waveform data according to one or more embodiments.

In some embodiments, as shown in FIG. 6, an apparatus 600 for analyzing high-frequency QRS waveform data is provided, which includes an acquisition module 601, a selection module 602, an index determining module 603, and a screening module 604.

The acquisition module 601 is configured to acquire the high-frequency QRS waveform data corresponding to exercise ECG data.

The selection module 602 is configured to select the high-frequency QRS waveform data in a first time period as first reference waveform data.

The selection module 602 is further configured to determine a first reference point according to a point with a minimum root-mean-square voltage in the first reference waveform data, and determining a second reference point according to a point with a maximum root-mean-square voltage and time earlier than the first reference point in the first reference waveform data.

The index determining module 603 is configured to determine a first amplitude drop relative value according to respective root-mean-square voltages of the first reference point and the second reference point.

The index determining module 603 is further configured to determine a maximum voltage according to the high-frequency QRS waveform data;

The selection module 602 is configured to select a point with a maximum root-mean-square voltage as a third reference point and a point with a minimum root-mean-square voltage and time later than the third reference point as a fourth reference point from the high-frequency QRS waveform data in a second time period.

The index determining module 603 is further configured to determine a voltage difference according to respective root-mean-square voltages of the third reference point and the fourth reference point.

The screening module 604 is configured to screen high-frequency QRS waveform data with the first amplitude drop relative value greater than or equal to a first preset threshold.

The index determining module 603 is used to determine vascular response capability according to a ratio of the voltage difference corresponding to the screened high-frequency QRS waveform data to the maximum voltage.

In some embodiments, the screening module 604 is further configured to screen the high-frequency QRS waveform data of corresponding waveform categories as a first category, a second category and a third category. Waveform characteristics of the first category include: a first amplitude drop relative value is greater than or equal to a first preset threshold, and a first amplitude rise relative value is greater than or equal to a second preset threshold. Waveform characteristics of the second category include: the first amplitude drop relative value is greater than or equal to the first preset threshold, a second amplitude rise relative value is less than a third preset threshold, and a duration of a second reference waveform data is greater than or equal to a preset duration threshold. Waveform characteristics of the third category include: the first amplitude drop relative value is greater than or equal to the first preset threshold, the second amplitude rise relative value is greater than or equal to the third preset threshold, and the duration of the second reference waveform data is greater than or equal to the preset duration threshold. The selection module 602 is further configured to select a fifth reference point that meets a screening condition from the first reference waveform data. A time of the fifth reference point is later than that of the first reference point. The index determining module 603 is further configured to determine the first amplitude rise relative value based on the root-mean-square voltage of the first reference point and a root-mean-square voltage of the fifth reference point. The selection module 602 is further configured to select, from the high-frequency QRS waveform data in the second time period, second reference waveform data whose amplitude fluctuation amplitude is less than or equal to a preset fluctuation amplitude; and select a point with a maximum root-mean-square voltage as a sixth reference point from the high-frequency QRS waveform data in a third time period. The index determining module 603 is further configured to determine the second amplitude rise relative value based on a root-mean-square voltage of an end point of the second reference waveform data and the root-mean-square voltage of the sixth reference point.

In some embodiments, the screening module 604 is further configured to screen the high-frequency QRS waveform data of a corresponding waveform category as a first category; or screen the high-frequency QRS waveform data of a corresponding waveform category as a second category; or screen the high-frequency QRS waveform data of a corresponding waveform category as a third category. The waveform characteristics of the first category include: a first amplitude drop relative value is greater than or equal to a first preset threshold, and a first amplitude rise relative value is greater than or equal to a second preset threshold. The waveform characteristics of the second category include: the first amplitude drop relative value is greater than or equal to the first preset threshold, the second amplitude rise relative value is less than a third preset threshold, and a duration of the second reference waveform data is greater than or equal to a preset duration threshold. The waveform characteristics of the third category include: the first amplitude drop relative value is greater than or equal to the first preset threshold, the second amplitude rise relative value is greater than or equal to the third preset threshold, and the duration of the second reference waveform data is greater than or equal to the preset duration threshold. The selection module 602 is further configured to select a fifth reference point that meets a screening condition from the first reference waveform data; and a time of the fifth reference point is later than that of the first reference point. The index determining module 603 is further configured to determine the first amplitude rise relative value based on the root-mean-square voltage of the first reference point and a root-mean-square voltage of the fifth reference point. The selection module 602 is further configured to select, from the high-frequency QRS waveform data in the second time period, second reference waveform data whose amplitude fluctuation amplitude is less than or equal to a preset fluctuation amplitude; and select a point with a maximum root-mean-square voltage as a sixth reference point from the high-frequency QRS waveform data in a third time period. The index determining module 603 is further configured to determine the second amplitude rise relative value based on a root-mean-square voltage of an end point of the second reference waveform data and the root-mean-square voltage of the sixth reference point.

In some embodiments, the index determining module 603 is further configured to determine a reference index according to the screened high-frequency QRS waveform data; where reference index includes the ratio of the voltage difference to the maximum voltage, and further includes at least one of the target amplitude drop relative value and the area of the target waveform drop region; and determine the vascular response capability according to the reference index.

In some embodiments, the index determining module 603 is further configured to determine a positive number according to the high-frequency QRS waveform data corresponding to the exercise ECG data; determine the vascular response capability according to the ratio of the voltage difference corresponding to the screened high-frequency QRS waveform data to the maximum voltage and the positive number; or, determine a reference index according to the screened high-frequency QRS waveform data, and determine the vascular response capability according to the reference index and the positive number. The reference index includes the ratio of the voltage difference to the maximum voltage, and further includes at least one of the target amplitude drop relative value and the area of the target waveform drop region.

For the specific limitation of the apparatus for analyzing the high-frequency QRS waveform data, please refer to the limitation of the method for analyzing the high-frequency QRS waveform data above, which will not be described in detail herein. Each module in the above-mentioned apparatus for analyzing the high-frequency QRS waveform data can be wholly or partially implemented by software, hardware, or a combination thereof. The above modules can be embedded in or independent of the processor in the computer device in the form of hardware, and can also be stored in the memory in the computer device in the form of software, so that the processor can call and execute the corresponding operations of the above modules.

Figure 7:
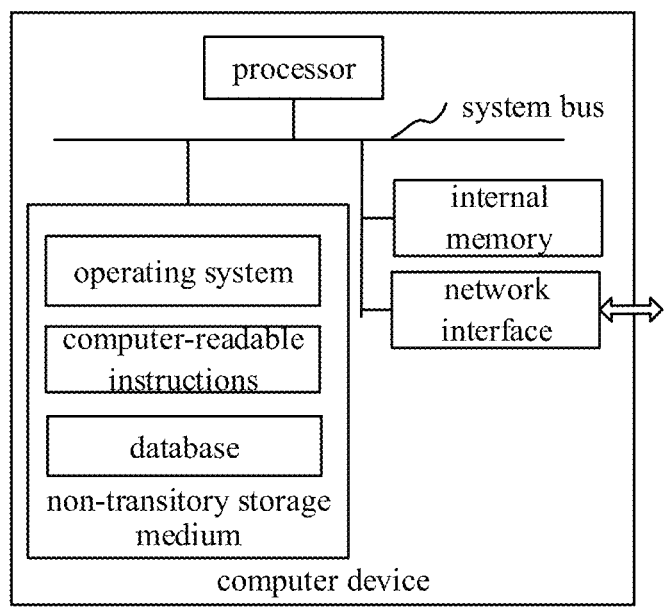
FIG. 7 illustrates an internal structural diagram of a computer device according to one or more embodiments.

In some embodiments, a computer device is provided, which may be a server, and its internal structure diagram may be as shown in FIG. 7. The computer device includes a processor, a memory and a network interface connected through a system bus. The processor of the computer device is used to provide computing and control capabilities. The memory of the computer device includes a non-transitory storage medium and an internal memory. The non-transitory storage medium stores an operating system, computer-readable instructions and a database. The internal memory provides an environment for the operation of the operating system and computer-readable instructions in the non-transitory storage medium. The database of the computer device is used to store the high-frequency QRS waveform data corresponding to the exercise ECG data. The network interface of the computer device is used to communicate with external terminals through network connection. The computer-readable instructions, when executed by the processor, implement the method for analyzing the high-frequency QRS waveform data.

It can be understood by those skilled in the art that the structure shown in FIG. 7 is only a block diagram of a part of the structure related to the scheme of the disclosure, and does not constitute a limitation on the computer device to which the scheme of the disclosure is applied. The specific computer device may include more or less components than those shown in the figure, or combine some components, or have different component arrangements.

In some embodiments, a computer device is also provided, which includes a memory and a processor. The memory is stored with computer-readable instructions, and the processor is configured to implement, when the computer-readable instructions executed by the processor, steps in various method embodiments.

In some embodiments, a computer-readable storage medium is stored with computer-readable storage instructions, and the computer-readable storage instructions is configured to be executed by a processor to implement the steps in various method embodiments.

Those skilled in the art can understand that all or part of the processes in the method for implementing the above-mentioned embodiments can be completed by instructing related hardware through computer-readable instructions, which can be stored in a non-transitory computer-readable storage medium, and when executed, the computer-readable instructions can include the processes of the above-mentioned methods. Any reference to memory, storage, database or other media used in the embodiments provided in the disclosure may include at least one of non-transitory and transitory memory. The non-transitory memory may include a read-only memory (ROM), a magnetic tape, a floppy disk, a flash memory, or an optical memory, etc. The transitory memory may include a random-access memory (RAM) or an external cache. By way of illustration and not limitation, RAM can be in various forms, such as a static random-access memory (SRAM) or a dynamic random-access memory (DRAM).

The technical features of the above embodiments may be combined arbitrarily, and all possible combinations of the technical features in the above embodiments are not described for the sake of brevity. However, as long as there is no contradiction between the combinations of these technical features, they should be considered to be within the scope of this specification.

The above-mentioned embodiments only express several implementations of the disclosure, and their descriptions are more specific and detailed, but they cannot be understood as limiting the scope of the disclosure. It should be pointed out that for those skilled in the art, without departing from the concept of the disclosure, several modifications and improvements can be made, which are within the protection scope of the disclosure. Therefore, the scope of protection of the disclosure shall be subject to the appended claims.

What is claimed is:

1. A method for analyzing high-frequency QRS waveform data, comprising:
    acquiring the high-frequency QRS waveform data corresponding to exercise electrocardiogram (ECG) data; wherein the exercise ECG data comprises ECG data of each of a resting stage, an exercise stage and a recovery stage;
    selecting the high-frequency QRS waveform data in a first time period as first reference waveform data; wherein the first time period consists of a period during the resting stage before the exercise stage and a period during the exercise stage, or the period during the exercise stage;
    determining a first reference point according to a point with a minimum root-mean-square voltage in the first reference waveform data, and determining a second reference point in the first reference waveform data, wherein a time of the second reference point is earlier than that of the first reference point in the first reference waveform data and the second reference point has a maximum root-mean-square voltage within a portion of the first reference waveform data prior to the first reference point;

determining a first amplitude drop relative value according to respective root-mean-square voltages of the first reference point and the second reference point;

acquiring a target voltage from the high-frequency QRS waveform data and determining a maximum voltage corresponding to the high-frequency QRS waveform data based on the target voltage;

selecting, from the high-frequency QRS waveform data in a second time period, a point with a maximum root-mean-square voltage as a third reference point and a point with a minimum root-mean-square voltage and time later than the third reference point as a fourth reference point; wherein the second time period comprises a period having a starting point with a time equal to or earlier than that of a starting point of the first time period and an ending point later than an ending point of the first time period;

determining a voltage difference according to respective root-mean-square voltages of the third reference point and the fourth reference point;

screening the high-frequency QRS waveform data with the first amplitude drop relative value greater than or equal to a first preset threshold; and determining vascular response capability according to a ratio of the voltage difference corresponding to the screened high-frequency QRS waveform data to the maximum voltage.

2. The method as claimed in claim 1, wherein the screening the high-frequency QRS waveform data with the first amplitude drop relative value greater than or equal to a first preset threshold comprises:

screening the high-frequency QRS waveform data of corresponding waveform categories as a first category, a second category and a third category;

wherein waveform characteristics of the first category comprise: the first amplitude drop relative value is greater than or equal to the first preset threshold, and a first amplitude rise relative value is greater than or equal to a second preset threshold;

wherein waveform characteristics of the second category comprise: the first amplitude drop relative value is greater than or equal to the first preset threshold, a second amplitude rise relative value is less than a third preset threshold, and a duration of second reference waveform data is greater than or equal to a preset duration threshold;

wherein waveform characteristics of the third category comprise: the first amplitude drop relative value is greater than or equal to the first preset threshold, the second amplitude rise relative value is greater than or equal to the third preset threshold, and the duration of the second reference waveform data is greater than or equal to the preset duration threshold;

wherein steps of determining the first amplitude rise relative value comprise:

selecting a fifth reference point that meets a screening condition from the first reference waveform data; a time of the fifth reference point being later than that of the first reference point; and determining the first amplitude rise relative value based on the root-mean-square voltage of the first reference point and a root-mean-square voltage of the fifth reference point; and wherein steps of determining the second amplitude rise relative value comprise:

selecting, from the high-frequency QRS waveform data in the second time period, the second reference waveform data whose amplitude fluctuation amplitude is less than or equal to a preset fluctuation amplitude;

selecting a point with a maximum root-mean-square voltage as a sixth reference point from the high-frequency QRS waveform data in a third time period; wherein the third time period comprises a period having a starting point with a time equal to that of the ending point of the second time period; and determining the second amplitude rise relative value based on a root-mean-square voltage of an end point of the second reference waveform data and the root-mean-square voltage of the sixth reference point.

3. The method as claimed in claim 1, wherein the screening the high-frequency QRS waveform data with the first amplitude drop relative value greater than or equal to a first preset threshold comprises:

screening the high-frequency QRS waveform data of a corresponding waveform category as a first category; or screening the high-frequency QRS waveform data of a corresponding waveform category as a second category; or screening the high-frequency QRS waveform data of a corresponding waveform category as a third category;

wherein waveform characteristics of the first category comprise: the first amplitude drop relative value is greater than or equal to the first preset threshold, and the first amplitude rise relative value is greater than or equal to a second preset threshold;

wherein waveform characteristics of the second category comprise: the first amplitude drop relative value is greater than or equal to the first preset threshold, a second amplitude rise relative value is less than a third preset threshold, and a duration of second reference waveform data is greater than or equal to a preset duration threshold;

wherein waveform characteristics of the third category comprise: the first amplitude drop relative value is greater than or equal to the first preset threshold, the second amplitude rise relative value is greater than or equal to the third preset threshold, and the duration of the second reference waveform data is greater than or equal to the preset duration threshold;

wherein steps of determining the first amplitude rise relative value comprise:

selecting a fifth reference point that meets a screening condition from the first reference waveform data; a time of the fifth reference point being later than that of the first reference point; and determining the first amplitude rise relative value based on the root-mean-square voltage of the first reference point and a root-mean-square voltage of the fifth reference point; and wherein steps of determining the second amplitude rise relative value comprise:

selecting, from the high-frequency QRS waveform data in the second time period, the second reference waveform data whose amplitude fluctuation amplitude is less than or equal to a preset fluctuation amplitude;

selecting a point with a maximum root-mean-square voltage as a sixth reference point from the high-frequency QRS waveform data in a third time period; wherein the third time period comprises a period having a starting point with a time equal to that of the ending point of the second time period; and determining the second amplitude rise relative value based on a root-mean-square voltage of an end point of the second reference waveform data and the root-mean-square voltage of the sixth reference point.

4. The method as claimed in claim 1, wherein the determining vascular response capability according to a ratio of the voltage difference corresponding to the screened high-frequency QRS waveform data to the maximum voltage comprises:

determining a reference index according to the screened high-frequency QRS waveform data; wherein the reference index comprises the ratio of the voltage difference to the maximum voltage, and further comprises at least one of a target amplitude drop relative value and an area of a target waveform drop region; and determining the vascular response capability according to the reference index.

5. The method as claimed in claim 2, wherein the determining vascular response capability according to a ratio of the voltage difference corresponding to the screened high-frequency QRS waveform data to the maximum voltage comprises:

determining a reference index according to the screened high-frequency QRS waveform data; wherein the reference index comprises the ratio of the voltage difference to the maximum voltage, and further comprises at least one of a target amplitude drop relative value and an area of a target waveform drop region; and determining the vascular response capability according to the reference index.

6. The method as claimed in claim 3, wherein the determining vascular response capability according to a ratio of the voltage difference corresponding to the screened high-frequency QRS waveform data to the maximum voltage comprises:

determining a reference index according to the screened high-frequency QRS waveform data; wherein the reference index comprises the ratio of the voltage difference to the maximum voltage, and further comprises at least one of a target amplitude drop relative value and an area of a target waveform drop region; and determining the vascular response capability according to the reference index.

7. The method as claimed in claim 1, further comprising:

determining a positive number according to the high-frequency QRS waveform data corresponding to the exercise ECG data; wherein the positive number is a number of the high-frequency QRS waveform data indicated as positive by lead positive indexes;

wherein the determining vascular response capability according to a ratio of the voltage difference corresponding to the screened high-frequency QRS waveform data to the maximum voltage comprises:

determining the vascular response capability according to the ratio of the voltage difference corresponding to the screened high-frequency QRS waveform data to the maximum voltage and the positive number; or determining a reference index according to the screened high-frequency QRS waveform data, and determining the vascular response capability according to the reference index and the positive number; wherein the reference index comprises the ratio of the voltage difference to the maximum voltage, and further comprises at least one of a target amplitude drop relative value and an area of a target waveform drop region.

8. The method as claimed in claim 2, further comprising:

determining a positive number according to the high-frequency QRS waveform data corresponding to the exercise ECG data; wherein the positive number is a number of the high-frequency QRS waveform data indicated as positive by lead positive indexes;

wherein the determining vascular response capability according to a ratio of the voltage difference corresponding to the screened high-frequency QRS waveform data to the maximum voltage comprises:

determining the vascular response capability according to the ratio of the voltage difference corresponding to the screened high-frequency QRS waveform data to the maximum voltage and the positive number; or determining a reference index according to the screened high-frequency QRS waveform data, and determining the vascular response capability according to the reference index and the positive number; wherein the reference index comprises the ratio of the voltage difference to the maximum voltage, and further comprises at least one of a target amplitude drop relative value and an area of a target waveform drop region.

9. The method as claimed in claim 3, further comprising:

determining a positive number according to the high-frequency QRS waveform data corresponding to the exercise ECG data; wherein the positive number is a number of the high-frequency QRS waveform data indicated as positive by lead positive indexes;

wherein the determining vascular response capability according to a ratio of the voltage difference corresponding to the screened high-frequency QRS waveform data to the maximum voltage comprises:

determining the vascular response capability according to the ratio of the voltage difference corresponding to the screened high-frequency QRS waveform data to the maximum voltage and the positive number; or determining a reference index according to the screened high-frequency QRS waveform data, and determining the vascular response capability according to the reference index and the positive number; wherein the reference index comprises the ratio of the voltage difference to the maximum voltage, and further comprises at least one of a target amplitude drop relative value and an area of a target waveform drop region.

10. An apparatus for analyzing high-frequency QRS waveform data, comprising:

an acquisition module, configured to acquire the high-frequency QRS waveform data corresponding to exercise ECG data; wherein the exercise ECG data comprises ECG data of each of a resting stage, an exercise stage and a recovery stage;

a selection module, configured to select the high-frequency QRS waveform data in a first time period as first reference waveform data; wherein the first time period consists of a period during the resting stage before the exercise stage and a period during the exercise stage, or the period during the exercise stage;

wherein the selection module is further configured to determine a first reference point according to a point with a minimum root-mean-square voltage in the first reference waveform data, and determine a second reference point in the first reference waveform data, wherein a time of the second reference point is earlier than that of the first reference point in the first reference waveform data and the second reference point has a maximum root-mean-square voltage within a portion of the first reference waveform data prior to the first reference point;

an index determining module, configured to determine a first amplitude drop relative value according to respective root-mean-square voltages of the first reference point and the second reference point;

wherein the index determining module is further configured to acquire a target voltage from the high-frequency QRS waveform data and determine a maximum voltage corresponding to the high-frequency QRS waveform data based on the target voltage;

wherein the selection module is further configured to select, from the high-frequency QRS waveform data in a second time period, a point with a maximum root-mean-square voltage as a third reference point and a point with a minimum root-mean-square voltage and time later than the third reference point as a fourth reference point; wherein the second time period comprises a period having a starting point with a time equal to or earlier than that of a starting point of the first time period and an ending point later than an ending point of the first time period;

wherein the index determining module is further configured to determine a voltage difference according to respective root-mean-square voltages of the third reference point and the fourth reference point;

a screening module, configured to screen the high-frequency QRS waveform data with the first amplitude drop relative value greater than or equal to a first preset threshold; and wherein the index determining module is further configured to determine vascular response capability according to a ratio of the voltage difference corresponding to the screened high-frequency QRS waveform data to the maximum voltage.

11. The apparatus as claimed in claim 10, wherein the screening module is further configured to screen the high-frequency QRS waveform data of corresponding waveform categories as a first category, a second category and a third category; waveform characteristics of the first category comprise: the first amplitude drop relative value is greater than or equal to the first preset threshold, and a first amplitude rise relative value is greater than or equal to a second preset threshold; waveform characteristics of the second category comprise: the first amplitude drop relative value is greater than or equal to the first preset threshold, a second amplitude rise relative value is less than a third preset threshold, and a duration of second reference waveform data is greater than or equal to a preset duration threshold; and waveform characteristics of the third category comprise: the first amplitude drop relative value is greater than or equal to the first preset threshold, the second amplitude rise relative value is greater than or equal to the third preset threshold, and the duration of the second reference waveform data is greater than or equal to the preset duration threshold; and wherein the selection module is further configured to select a fifth reference point that meets a screening condition from the first reference waveform data; and a time of the fifth reference point is later than that of the first reference point;

wherein the index determining module is further configured to determine the first amplitude rise relative value based on the root-mean-square voltage of the first reference point and a root-mean-square voltage of the fifth reference point;

wherein the selection module is further configured to select, from the high-frequency QRS waveform data in the second time period, second reference waveform data whose amplitude fluctuation amplitude is less than or equal to a preset fluctuation amplitude; and select a point with a maximum root-mean-square voltage as a sixth reference point from the high-frequency QRS waveform data in a third time period; wherein the third time period comprises a period having a starting point with a time equal to that of the ending point of the second time period; and wherein the index determining module is further configured to determine the second amplitude rise relative value based on a root-mean-square voltage of an end point of the second reference waveform data and the root-mean-square voltage of the sixth reference point.

12. The apparatus as claimed in claim 10, wherein the screening module is further configured to screen the high-frequency QRS waveform data of a corresponding waveform category as a first category; screen the high-frequency QRS waveform data of a corresponding waveform category as a second category; or screen the high-frequency QRS waveform data of a corresponding waveform category as a third category; the waveform characteristics of the first category comprise: the first amplitude drop relative value is greater than or equal to the first preset threshold, and a first amplitude rise relative value is greater than or equal to a second preset threshold; waveform characteristics of the second category comprise: the first amplitude drop relative value is greater than or equal to the first preset threshold, a second amplitude rise relative value is less than a third preset threshold, and a duration of the second reference waveform data is greater than or equal to a preset duration threshold; and waveform characteristics of the third category comprise: the first amplitude drop relative value is greater than or equal to the first preset threshold, the second amplitude rise relative value is greater than or equal to the third preset threshold, and the duration of the second reference waveform data is greater than or equal to the preset duration threshold;

wherein the selection module is further configured to select a fifth reference point that meets a screening condition from the first reference waveform data; and a time of the fifth reference point is later than that of the first reference point;

wherein the index determining module is further configured to determine the first amplitude rise relative value based on the root-mean-square voltage of the first reference point and a root-mean-square voltage of the fifth reference point;

wherein the selection module is further configured to select, from the high-frequency QRS waveform data in the second time period, the second reference waveform data whose amplitude fluctuation amplitude is less than or equal to a preset fluctuation amplitude; and select a point with a maximum root-mean-square voltage as a sixth reference point from the high-frequency QRS waveform data in a third time period; wherein the third time period comprises a period having a starting point with a time equal to that of the ending point of the second time period; and wherein the index determining module is further configured to determine the second amplitude rise relative value based on a root-mean-square voltage of an end point of the second reference waveform data and the root-mean-square voltage of the sixth reference point.

13. The apparatus as claimed in claim 10, wherein the index determining module is further configured to determine a reference index according to the screened high-frequency QRS waveform data; wherein the reference index comprises the ratio of the voltage difference to the maximum voltage, and further comprises at least one of a target amplitude drop relative value and an area of a target waveform drop region; and determine the vascular response capability according to the reference index.

14. The apparatus as claimed in claim 10, wherein the index determining module is further configured to determine a positive number according to the high-frequency QRS waveform data corresponding to the exercise ECG data; determine the vascular response capability according to the ratio of the voltage difference corresponding to the screened high-frequency QRS waveform data to the maximum voltage and the positive number; or, determine a reference index according to the screened high-frequency QRS waveform data, and determining the vascular response capability according to the reference index and the positive number; wherein the reference index comprises the ratio of the voltage difference to the maximum voltage, and further comprises at least one of a target amplitude drop relative value and an area of a target waveform drop region; and the positive number is a number of the high-frequency QRS waveform data indicated as positive by lead positive indexes.

15. A computer device, comprising a memory and a processor, wherein the memory is stored with computer-readable instructions, and the processor is configured to implement, when the computer-readable instructions executed by the processor, steps of the method for analyzing high-frequency QRS waveform data as claimed in claim 1.

16. A non-transitory computer-readable storage medium, wherein the non-transitory computer-readable storage medium is stored with computer-readable storage instructions, and the computer-readable storage instructions is configured to be executed by a processor to implement steps of the method for analyzing high-frequency QRS waveform data as claimed in claim 1.

17. The method as claimed in claim 1, wherein the acquiring a target voltage from the high-frequency QRS waveform data and determining a maximum voltage corresponding to the high-frequency QRS waveform data based on the target voltage comprises:
acquiring a maximum root-mean-square voltage from the high-frequency QRS waveform data as the target voltage, and taking the target voltage as the maximum voltage corresponding to the high-frequency QRS waveform data; or
acquiring the maximum root-mean-square voltage from the high-frequency QRS waveform data as the target voltage, correcting the target voltage by summing the target voltage with a preconfigured correction coefficient to obtain a sum of the target voltage and the preconfigured correction coefficient as a corrected target voltage, and taking the corrected target voltage as the maximum voltage corresponding to the high-frequency QRS waveform data; or
acquiring the maximum root-mean-square voltage from the high-frequency QRS waveform data as the target voltage, correcting the target voltage by multiplying the target voltage with the preconfigured correction coefficient to obtain a product of the target voltage and the preconfigured correction coefficient as the corrected target voltage, and taking the corrected target voltage as the maximum voltage corresponding to the high-frequency QRS waveform data; or
acquiring the maximum root-mean-square voltage from the high-frequency QRS waveform data as the target voltage, and rounding up the target voltage or the corrected target voltage as the maximum voltage corresponding to the high-frequency QRS waveform data.

18. The apparatus as claimed in claim 10, wherein the index determining module is further configured to:
acquire a maximum root-mean-square voltage from the high-frequency QRS waveform data as the target voltage, and take the target voltage as the maximum voltage corresponding to the high-frequency QRS waveform data; or
acquire the maximum root-mean-square voltage from the high-frequency QRS waveform data as the target voltage, correct the target voltage by summing the target voltage with a preconfigured correction coefficient to obtain a sum of the target voltage and the preconfigured correction coefficient as a corrected target voltage, and taking the corrected target voltage as the maximum voltage corresponding to the high-frequency QRS waveform data; or
acquire the maximum root-mean-square voltage from the high-frequency QRS waveform data as the target voltage, correct the target voltage by multiplying the target voltage with the preconfigured correction coefficient to obtain a product of the target voltage and the preconfigured correction coefficient as the corrected target voltage, and take the corrected target voltage as the maximum voltage corresponding to the high-frequency QRS waveform data; or
acquire the maximum root-mean-square voltage from the high-frequency QRS waveform data as the target voltage, and round up the target voltage or the corrected target voltage as the maximum voltage corresponding to the high-frequency QRS waveform data.

* * * * *